United States Patent
Patil et al.

(10) Patent No.: US 10,820,346 B2
(45) Date of Patent: Oct. 27, 2020

(54) CLEAR CHANNEL ASSESSMENT ADJUSTMENT FOR IN-BAND LINK AGGREGATION

(71) Applicant: QUALCOMM Incorporated, San Diego, CA (US)

(72) Inventors: Abhishek Pramod Patil, San Diego, CA (US); George Cherian, San Diego, CA (US); Alfred Asterjadhi, San Diego, CA (US); Venkata Ramanan Venkatachalam Jayaraman, San Diego, CA (US); Yanjun Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 63 days.

(21) Appl. No.: 16/111,976

(22) Filed: Aug. 24, 2018

(65) Prior Publication Data
US 2019/0082463 A1    Mar. 14, 2019

Related U.S. Application Data

(60) Provisional application No. 62/556,887, filed on Sep. 11, 2017.

(51) Int. Cl.
*H04W 74/08* (2009.01)
(52) U.S. Cl.
CPC .............................. *H04W 74/0808* (2013.01)
(58) Field of Classification Search
CPC ................................................. H04W 74/0808
See application file for complete search history.

(56) References Cited

U.S. PATENT DOCUMENTS

| 2012/0250532 A1* | 10/2012 | Husted .............. H04W 74/0808 370/252 |
| 2015/0103663 A1 | 4/2015 | Amini et al. |
| 2015/0289299 A1* | 10/2015 | Abraham .............. H04L 45/245 370/328 |

(Continued)

OTHER PUBLICATIONS

International Search Report and Written Opinion—PCT/US2018/048183—ISA/EPO—dated Nov. 26, 2018.

*Primary Examiner* — Jianye Wu
(74) *Attorney, Agent, or Firm* — Holland & Hart LLP/Qualcomm

(57) ABSTRACT

The described techniques relate to improved methods, systems, devices, or apparatuses that support clear channel assessment adjustment for in-band link aggregation. Generally, the described techniques provide for improved handling of adjacent channel interference in multi-link aggregation scenarios. In accordance with the described techniques, a device may establish a set of wireless links for communication with a second device, the set of wireless links supporting parallel transmission during at least a first duration of a multi-link session, the set of wireless links including at least a first wireless link and a second wireless link. The device may identify a parameter value modifying a channel availability threshold to use during a channel access procedure for a first wireless channel of the first wireless link based on a presence of the second wireless link. The device may perform the channel access procedure for the first wireless channel based on the identified parameter value.

30 Claims, 17 Drawing Sheets

(56) References Cited

U.S. PATENT DOCUMENTS

2016/0021661 A1\* 1/2016 Yerramalli ............ H04W 16/14
　　　　　　　　　　　　　　　　　　　　　370/329
2017/0012748 A1\* 1/2017 Dabeer ................. H04L 5/0007
2017/0079010 A1\* 3/2017 Zhang ................. H04W 72/005

\* cited by examiner

CLEAR CHANNEL ASSESSMENT ADJUSTMENT FOR IN-BAND LINK AGGREGATION

CROSS REFERENCES

The present Application for patent claims the benefit of U.S. Provisional Patent Application No. 62/556,887 by Patil, et al., entitled "Clear channel Assessment Adjustment For In-Band Link Aggregation," filed Sep. 11, 2017, assigned to the assignee hereof, and expressly incorporated herein.

BACKGROUND

The present disclosure relates generally to wireless communication, and more specifically to clear channel assessment adjustment for in-band link aggregation.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include AP that may communicate with one or more stations (STAs) or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a STA may communicate with an associated AP via downlink and uplink. The downlink (or forward link) may refer to the communication link from the AP to the station, and the uplink (or reverse link) may refer to the communication link from the station to the AP.

Some wireless communications systems may support multi-link aggregation, where transmissions may be transmitted and/or received over two or more links between two wireless devices (e.g., AP and STA). In some cases, a transmission on one link in the multi-link session may interfere with a transmission on one or more other links of the multi-link session. For example, adjacent channel interference (ACI) may result from leakage of signal power from an adjacent channel (e.g., due to inadequate filtering, improper tuning, etc.). ACI may negatively impact a communications system, for example by decreasing throughput on adjacent links or increasing signal processing requirements at communicating devices. Improved techniques for ACI management in multi-link aggregation may be desired.

SUMMARY

The described techniques relate to improved methods, systems, devices, or apparatuses that support clear channel assessment adjustment for in-band link aggregation. Generally, the described techniques provide for improved handling of adjacent channel interference (ACI) in multi-link aggregation scenarios. A wireless device (e.g., a STA) may establish multiple wireless links with a second wireless device (e.g., an AP). The links may support parallel transmissions, including data exchange. In some cases, the links may support simultaneous (e.g., synchronized) transmissions. Alternatively, transmissions over the links may not be synchronized, as described further below. During at least some durations, two or more of the links may be used for communications between the wireless devices, either in the same direction (e.g., all uplink, all downlink, etc.) or in different directions. To support the parallel communications, the wireless device may identify a parameter that controls a clear channel assessment (CCA) procedure for a wireless channel of one of the links based at least in part on a presence of a second wireless link. The second wireless link may be proximal in frequency to the first wireless link, or otherwise subject the first wireless link to ACI during transmissions.

The wireless device may then perform the CCA procedure for the first wireless channel based on the identified parameter. Various parameters are considered and described further below. For example, the parameter may be dynamically determined (e.g., based on some communication conditions such as antenna separation, frequency offset between the channels, etc.). Additionally or alternatively, the parameter may be based at least in part on a successful CCA procedure for the other wireless link. In some cases, the first wireless link may bypass or cut short its own channel access countdown after receiving an indication that the second wireless link has completed its channel access countdown and has or is about to commence transmissions on the second wireless link. In other cases, the first wireless link may wait for a channel access countdown (e.g., an enhanced distributed channel access (EDCA) countdown) of a second wireless link to complete before transmitting on the first wireless link to ensure that both the first and second wireless links are clear. In still other cases, one wireless link may adjust a CCA threshold used to perform CCA based on the presence of a second wireless link, for example using an ACI value, for example a measured ACI value, for the second wireless link. Adjusting the CCA threshold may involve applying an ED threshold to a baseline CCA threshold.

A method of wireless communication is described. The method may include establishing a plurality of wireless links between the first wireless device and a second wireless device, the plurality of wireless links supporting parallel transmission over the plurality of wireless links during at least a first duration of a multi-link session, the plurality of wireless links including at least a first wireless link and a second wireless link, identifying a parameter value modifying a channel availability threshold to use during a CCA procedure for a first wireless channel of the first wireless link based at least in part on a presence of the second wireless link, and performing the CCA procedure for the first wireless channel based at least in part on the identified parameter value.

An apparatus for wireless communication is described. The apparatus may include means for establishing a plurality of wireless links between the first wireless device and a second wireless device, the plurality of wireless links supporting parallel transmission over the plurality of wireless links during at least a first duration of a multi-link session, the plurality of wireless links including at least a first wireless link and a second wireless link, means for identifying a parameter value modifying a channel availability threshold to use during a CCA procedure for a first wireless channel of the first wireless link based at least in part on a presence of the second wireless link, and means for performing the CCA procedure for the first wireless channel based at least in part on the identified parameter value.

Another apparatus for wireless communication is described. The apparatus may include a processor, memory in electronic communication with the processor, and instructions stored in the memory. The instructions may be operable to cause the processor to establish a plurality of wireless links between the first wireless device and a second wireless device, the plurality of wireless links supporting parallel transmission over the plurality of wireless links during at least a first duration of a multi-link session, the plurality of wireless links including at least a first wireless link and a second wireless link, identify a parameter value modifying a channel availability threshold to use during a CCA procedure for a first wireless channel of the first wireless link based at least in part on a presence of the second wireless link, and perform the CCA procedure for the first wireless channel based at least in part on the identified parameter value.

A non-transitory computer readable medium for wireless communication is described. The non-transitory computer-readable medium may include instructions operable to cause a processor to establish a plurality of wireless links between the first wireless device and a second wireless device, the plurality of wireless links supporting parallel transmission over the plurality of wireless links during at least a first duration of a multi-link session, the plurality of wireless links including at least a first wireless link and a second wireless link, identify a parameter value modifying a channel availability threshold to use during a CCA procedure for a first wireless channel of the first wireless link based at least in part on a presence of the second wireless link, and perform the CCA procedure for the first wireless channel based at least in part on the identified parameter value.

In some examples of the method, apparatus, and non-transitory computer-readable medium described above, identifying the parameter value comprises identifying, based at least in part on the presence of the second wireless link, a level of the channel availability threshold to be used during the CCA procedure for the first wireless channel.

Some examples of the method, apparatus, and non-transitory computer-readable medium described above may further include processes, features, means, or instructions for identifying that a second wireless channel of the second wireless link may be clear based at least in part on a second CCA procedure. Some examples of the method, apparatus, and non-transitory computer-readable medium described above may further include processes, features, means, or instructions for bypassing a channel access countdown for the first wireless channel based at least in part on identifying that the second wireless channel may be clear.

Some examples of the method, apparatus, and non-transitory computer-readable medium described above may further include processes, features, means, or instructions for communicating using the second wireless channel of the second wireless link based at least in part on the second CCA procedure indicating that energy detected on the second wireless channel may be below a second channel availability threshold, transmissions on the second wireless channel synchronized with transmissions on the first wireless channel.

Some examples of the method, apparatus, and non-transitory computer-readable medium described above may further include processes, features, means, or instructions for performing a channel access countdown for a second wireless channel of the second wireless link. Some examples of the method, apparatus, and non-transitory computer-readable medium described above may further include processes, features, means, or instructions for performing the CCA procedure for the first wireless channel following the channel access countdown for the second wireless channel, where the parameter value modifying the channel availability threshold comprises the channel access countdown for the second wireless channel.

Some examples of the method, apparatus, and non-transitory computer-readable medium described above may further include processes, features, means, or instructions for performing a second CCA procedure for the second wireless channel of the second wireless link following the channel access countdown for the second wireless channel. Some examples of the method, apparatus, and non-transitory computer-readable medium described above may further include processes, features, means, or instructions for communicating on the first wireless channel and the second wireless channel based at least in part on the second CCA procedure indicating the second wireless channel may be clear.

In some examples of the method, apparatus, and non-transitory computer-readable medium described above, identifying the parameter value comprises determining a channel interference value for the first wireless channel based at least in part on transmissions on a second wireless channel of the second wireless link. Some examples of the method, apparatus, and non-transitory computer-readable medium described above may further include processes, features, means, or instructions for adjusting, based at least in part on the determined channel interference value, a level of the channel availability threshold to use during the CCA procedure for the first wireless channel.

Some examples of the method, apparatus, and non-transitory computer-readable medium described above may further include processes, features, means, or instructions for performing a channel access countdown for the first wireless channel.

Some examples of the method, apparatus, and non-transitory computer-readable medium described above may further include processes, features, means, or instructions for communicating on the first wireless channel following the channel access countdown based at least in part on the CCA procedure using the adjusted channel availability threshold level indicating that the first wireless channel may be clear.

Some examples of the method, apparatus, and non-transitory computer-readable medium described above may further include processes, features, means, or instructions for adjusting the level of the channel availability threshold to use during the CCA procedure may be further based at least in part on a tolerance number, or a frequency separation between the first wireless channel and the second wireless channel, or a separation between two or more antennas of the first wireless device, or a combination thereof.

In some examples of the method, apparatus, and non-transitory computer-readable medium described above, adjusting the level of the channel availability threshold to use during the CCA procedure comprises applying an energy detection offset to the channel availability threshold.

Some examples of the method, apparatus, and non-transitory computer-readable medium described above may further include processes, features, means, or instructions for identifying, at a first lower media access control (MAC) layer of the first wireless device for the first wireless link, the presence of the second wireless link based at least in part on an indication received from a second lower MAC layer of the first wireless device for the second wireless link.

Some examples of the method, apparatus, and non-transitory computer-readable medium described above may further include processes, features, means, or instructions for identifying, at a first lower MAC layer of the first wireless device for the first wireless link, the presence of the second wireless link based at least in part on an indication received from an upper MAC layer of the first wireless device.

Some examples of the method, apparatus, and non-transitory computer-readable medium described above may further include processes, features, means, or instructions for receiving, from the second wireless device, an operating mode indicator (OMI) indicating a capability of the second wireless device to support the parallel transmission over the plurality of wireless links, wherein the plurality of wireless links between the first wireless device and the second wireless device may be established based at least in part on the received OMI.

In some examples of the method, apparatus, and non-transitory computer-readable medium described above, the first wireless link comprises the first wireless channel in a first radio frequency (RF) spectrum band. In some examples of the method, apparatus, and non-transitory computer-readable medium described above, the second wireless link comprises a second wireless channel in the first RF spectrum band or a second RF spectrum band.

DETAILED DESCRIPTION

Some wireless communications systems may support multiple parallel links between communicating devices (e.g., to increase throughput). A wireless link may refer to a communication path between devices, and each link may support one or more channels or logical entities that support multiplexing of data, such that during at least some duration of time, transmissions or portions of transmission may occur over both links at the same time, either synchronously, or asynchronously. Such parallel communications, while benefiting the system in terms of throughput, may increase the complexity of the system. As an example, two devices may communicate over two or more adjacent links. As used herein, the term "adjacent" in reference to links may be used to convey relative proximity in frequency. The links may in some cases be separated from each other (e.g., may not be contiguous in frequency, but may be channels affected by ACI) without deviating from the scope of the disclosure. Because of the proximity of the links, communications over a first channel of a first wireless link may interfere with communications over a second channel of a second wireless link. As an example, a transmission associated with the first link may be associated with a given power spectral density. In some cases, some of the signal power associated with the transmission may leak into the second channel (e.g., signal processing at the devices may not be sufficient to ensure complete separation of the channels). In such cases, the signal may represent an example of adjacent channel interference, which may negatively impact the system. For example, a device may sense the leaked signal power on the adjacent channel and refrain from transmitting based on mistakenly assuming that the channel is not idle. As described further below, a device may use CCA adjustments for in-band link aggregation to ameliorate ACI-related issues.

In some cases, the parallel wireless links may support simultaneous (e.g., synchronized) transmissions. In some cases or during certain time durations, transmissions over the links may be parallel, but not be synchronized or simultaneous. During at least some durations, two or more of the links may be used for communications between the wireless devices, either in the same direction (e.g., all uplink, all downlink, etc.) or in different directions (e.g., some uplink and some downlink). In some cases, the parallel links between wireless devices may operate in a full duplex mode, where downlink communications may be sent by one wireless device to be received by a second wireless device at the same time that uplink communications are sent by the second wireless device to be received by the first wireless device. Generally, a full duplex system may allow for bi-directional communications where wireless devices may transmit and receive at the same time.

Figure 1:
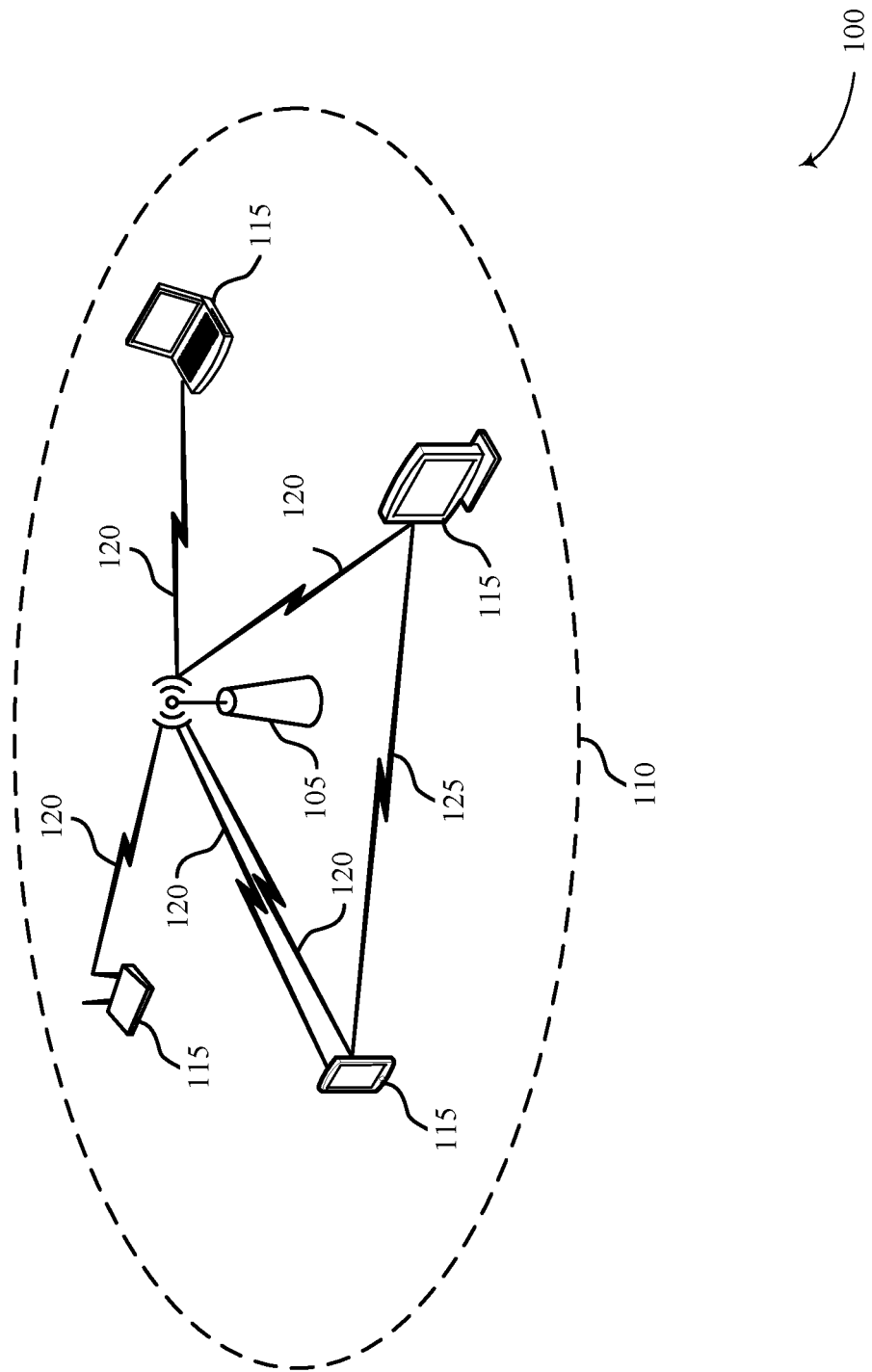
FIG. 1 illustrates an example of a system for wireless communication that supports clear channel assessment adjustment for in-band link aggregation in accordance with aspects of the present disclosure.

Aspects of the disclosure are initially described in the context of a wireless communications system. Aspects of the disclosure are then described in the context of various transmission schemes. Aspects of the disclosure are further illustrated by and described with reference to apparatus diagrams, system diagrams, and flowcharts that relate to clear channel assessment adjustment for in-band link aggregation FIG. 1 illustrates a wireless local area network (WLAN) 100 (also known as a Wi-Fi network) configured in accordance with various aspects of the present disclosure. The WLAN 100 may include an AP 105 and multiple associated STAs 115, which may represent devices such as wireless communication terminals, including mobile stations, phones, personal digital assistant (PDAs), other handheld devices, netbooks, notebook computers, tablet computers, laptops, display devices (e.g., TVs, computer monitors, etc.), printers, etc. The AP 105 and the associated stations 115 may represent a basic service set (BSS) or an extended service set (ESS). The various STAs 115 in the network are able to communicate with one another through the AP 105. Also shown is a coverage area 110 of the AP 105, which may represent a basic service area (BSA) of the WLAN 100. An extended network station associated with the WLAN 100 may be connected to a wired or wireless distribution system that may allow multiple APs 105 to be connected in an ESS.

A STA 115 may be located in the intersection of more than one coverage area 110 and may associate with more than one AP 105. A single AP 105 and an associated set of STAs 115 may be referred to as a BSS. An ESS is a set of connected BSSs. A distribution system may be used to connect APs 105 in an ESS. In some cases, the coverage area 110 of an AP 105 may be divided into sectors. The WLAN 100 may include APs 105 of different types (e.g., metropolitan area, home network, etc.), with varying and overlapping coverage areas 110. Two STAs 115 may also communicate directly via a direct wireless link 125 regardless of whether both STAs 115 are in the same coverage area 110. Examples of direct wireless links 125 may include Wi-Fi Direct connections, Wi-Fi Tunneled Direct Link Setup (TDLS) links, and other group connections. STAs 115 and APs 105 may communicate according to the WLAN radio and baseband protocol for physical and MAC layers from IEEE 802.11 and versions including, but not limited to, 802.11b, 802.11g, 802.11a, 802.11n, 802.11ac, 802.11ad, 802.11ah, 802.11ax, 802.11az, 802.11ba, etc. In other implementations, peer-to-peer connections or ad hoc networks may be implemented within WLAN 100. Devices in WLAN 100 may communicate over unlicensed spectrum, which may be a portion of spectrum that includes frequency bands traditionally used by Wi-Fi technology, such as the 5 GHz band, the 2.4 GHz band, the 60 GHz band, the 3.6 GHz band, and/or the 900 MHz band. The unlicensed spectrum may also include other frequency bands.

In some cases, a STA 115 (or an AP 105) may be detectable by a central AP 105, but not by other STAs 115 in the coverage area 110 of the central AP 105. For example, one STA 115 may be at one end of the coverage area 110 of the central AP 105 while another STA 115 may be at the other end. Thus, both STAs 115 may communicate with the AP 105, but may not receive the transmissions of the other. This may result in colliding transmissions for the two STAs 115 in a contention-based environment (e.g., carrier-sense multiple access (CSMA)/collision avoidance (CA)) because the STAs 115 may not refrain from transmitting on top of each other. A STA 115 whose transmissions are not identifiable, but that is within the same coverage area 110 may be known as a hidden node. CSMA/CA may be supplemented by the exchange of a request-to-send (RTS) packet transmitted by a sending STA 115 (or AP 105) and a clear-to-send (CTS) packet transmitted by the receiving STA 115 (or AP 105). This exchange may alert other devices within range of the sender and receiver not to transmit for the duration of the primary transmission. Thus, RTS/CTS handshake may help mitigate a hidden node problem.

In a system supporting multi-link aggregation (which may also be referred to as multichannel aggregation), some of the traffic associated with a single STA 115 may be transmitted across multiple parallel communication links 120 (which may also be referred to as "links" herein). Multi-link aggregation may thus provide a means to increase network capacity and maximize the utilization of available resources. In some cases, each communication link 120 for a given wireless device may be associated with a respective radio of the wireless device (e.g., where a radio comprises transmit/ receive chains, physical antennas, signal processing components, etc.). Multi-link aggregation may be implemented in a number of ways. As a first example, the multi-link aggregation may be referred to as packet-based. In packet-based aggregation, frames of a single traffic flow (e.g., all traffic associated with a given traffic identifier (TID)) may be sent concurrently across multiple communication links 120 (e.g., on multiple channels). In some cases, the multiple communication links 120 may operate in the same radio frequency (RF) spectrum band (e.g., each link may be in the 5 GHz band, and use channels in the 5 GHz band). In other cases, the multiple communication links 120 may be in different RF spectrum bands (e.g., one may be in the 2.4 GHz band while another is in the 5 GHz band). Each link may be associated with a different physical layer (PHY) and lower media access control (MAC) layer, as described with reference to FIG. 6. In such an implementation, management of the aggregation of the separate communication links 120 may be performed at a higher MAC layer. The multi-link aggregation implemented at the lower MAC layers and PHY layers may be transparent to the upper layers of the wireless device.

As another example, the multi-link aggregation may be referred to as flow-based. In flow-based aggregation, each traffic flow (e.g., all traffic associated with a given TID) may be sent using one of multiple available communication links 120. As an example, a single STA 115 may access a web browser while streaming a video in parallel. The traffic associated with the web browser access may be communicated over a first channel of a first communication link 120 while the traffic associated with the video stream may be communicated over a second channel of a second communication link 120 in parallel (e.g., at least some of the data may be transmitted on the first channel concurrent with data transmitted on the second channel). In some examples, the transmissions on the first communication link 120 and the second communication link 120 may be synchronized. In other examples, the transmissions may be asynchronous. As described above, the channels may belong to the same RF band or to different RF bands. In the case of more than two communication links 120 (e.g., three links), all three may support operation over the same RF band, two but not the third may support operation over the same RF band, or each link may support operation for a separate RF band. In some cases, flow-based aggregation may not use cross-link packet scheduling and reordering (e.g., which may be used to support packet-based aggregation). Alternatively, in the case of a single flow (e.g., in the case that the STA 115 simply attempts to access a web browser), aggregation gain may not be available.

In other embodiments, a hybrid of flow-based and packet-based aggregation may be employed. As an example, a device may employ flow-based aggregation in situations in which multiple traffic flows are created and may employ packet-based aggregation in other situations. The decision to switch between multi-link aggregation techniques (e.g., modes) may additionally or alternatively be based on other metrics (e.g., a time of day, traffic load within the network, battery power for a wireless device, etc.).

To support the described multi-link aggregation techniques, APs 105 and STAs 115 may exchange supported aggregation capability information (e.g. supported aggregation type, supported frequency bands, etc.). In some cases, the exchange of information may occur via a beacon signal, a probe request or probe response, an association request or an association response frame, dedicated action frames, an operating mode indicator (OMI), etc. In some cases, an AP 105 may designate a given channel in a given band as an anchor channel (e.g., the channel on which it transmits beacons and other management frames). In this case, the AP 105 may transmit beacons (e.g., which may contain less information) on other channels for discovery purposes. Although described as being frequency-based, the anchor channel could additionally or alternatively refer to a point in time (e.g., an AP 105 may transmit its beacon at a certain time on one or more channels).

In some examples, in multi-link aggregation, each link may use its own transmit queue. In other examples, a common transmit queue may be used. In some examples, each link may have a unique transmitter address (TA) and receiver address (RA). In other examples, the TA and RA may be common across the multiple links used for multi-link aggregation. In other examples, one or more of a sequence number (SN), frame number (FN), and/or packet number (PN) may be common across the communication links. Other items that may be common across links include encryption keys, MAC packet data unit (MPDU) generation and/or encryption, aggregated MAC service data unit (AMSDU) constraints, fragment size, and reordering, replay check, and/or de-fragmentation techniques. In other examples, encryption keys may be per-link.

In some examples, multi-link aggregation may use multiple sequence numbers. In other examples, aggregation may be performed over non-co-located APs. In some examples, power may be saved by idling unused channels or links of the multi-link aggregation scheme. A STA 115 may then monitor a non-idled link (e.g., an anchor link), reserved for receiving information regarding data to be received on the various links.

In various examples, BAs may be sent in response to multi-link transmissions. For example, a BA session may refer to sending an acknowledgment (ACK) for multiple MPDUs sent together (e.g., an ACK for a block of MPDUs). Both the transmitting device (e.g., the device requesting the BA) and the receiving device (e.g., the device transmitting the BA) may maintain a sliding window (e.g., a BA window), and may have previously negotiated the size of the BA. For example, a BA session may have a BA size of 64 MPDUs (e.g., other BA size examples may include 256 MPDUs, 1024 MPDUs, etc.). In such cases, a transmitting device may transmit 64 MPDUs followed by a block acknowledgment request (BAR). In response to the BAR, the receiving device may, upon reception of the 64 MPDUs and the BAR, transmit a BA to the transmitting device. The BA may indicate whether all 64 MPDUs were received correctly, which MPDUs are missing, etc. In some cases, a BA may be used to indicate the longer BA window, or a capability exchange or agreement defining the larger BA window may also be sent. In other examples, a single SN may be used, but with multiple scorecards (e.g., one per channel or link), or with a global as well as per-link scorecards. Multi-link aggregation (e.g., flow-based and/or packet-based) may increase network capacity by efficiently allocating utilization of multiple links (and multiple channels).

In either case (e.g., flow-based or packet-based aggregation), transmissions across a first channel of a first communication link 120 may interfere with transmissions across a second channel of a second communication link 120. Techniques described herein may be used to alleviate issues caused by such adjacent channel interference. For example, a wireless device (e.g., a STA 115) may identify a parameter value to be used in a channel access procedure for one or both of the adjacent channels based at least in part on a presence of the other channel. For example, the parameter value may be based on a proximity (in frequency) of the channels, an antenna separation at the wireless device, etc. In some cases, the parameter value may influence a timing of the channel access procedure and/or a channel availability threshold to be used during the channel access procedure.

Figure 2:
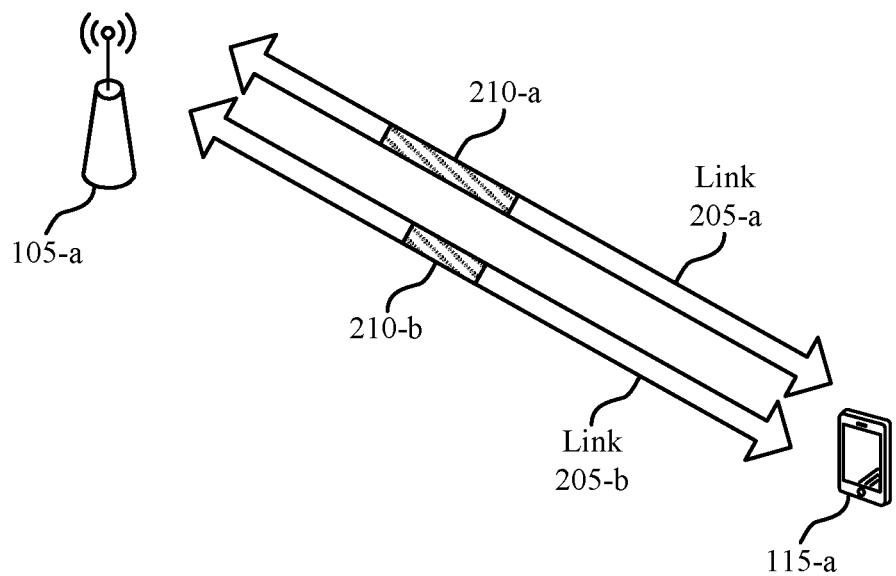
FIG. 2 illustrates an example of a wireless communications system that supports clear channel assessment adjustment for in-band link aggregation in accordance with aspects of the present disclosure.
Figure 2:
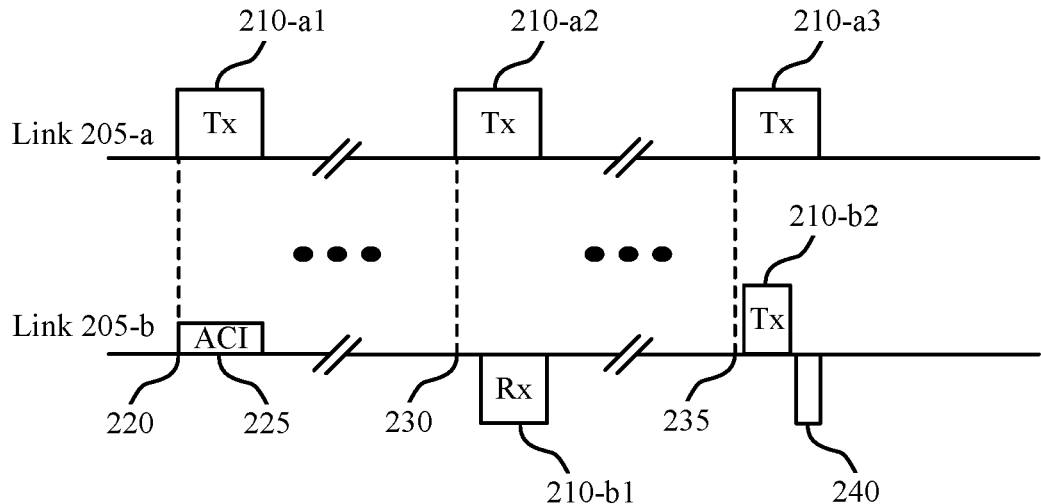

FIG. 2 illustrates an example of a WLAN 200 that supports techniques for clear channel assessment adjustment for in-band link aggregation in accordance with various aspects of the present disclosure. In some examples, WLAN 200 may implement aspects of WLAN 100. A wireless connection between AP 105-a and STA 115-a may be referred to as a link 205 (a communication link), and each link may include one or more channels. As an example, WLAN 200 may support multi-link aggregation such that AP 105-a and STA 115-a may communicate in parallel over two or more links (e.g., link 205-a and link 205-b). STA 115-a may thus receive packets (e.g., MPDUs) over both link 205-a and link 205-b from AP 105-a. Such parallel communications over the two or more links may be synchronized (e.g., simultaneous) or unsynchronized (e.g., asynchronous), and may be uplink, or downlink, or a combination of uplink and downlink during a particular duration of time.

Such multi-link aggregation may provide multiple benefits to WLAN 200. For example, multi-link aggregation may improve user perceived throughput (UPT) (e.g., by quickly flushing per-user transmit queues). Similarly, multi-link aggregation may improve throughput for WLAN 200 by improving utilization of available channels (e.g., by increasing trunking gains). Networks that do not support multi-link aggregation may experience under-utilization of spectrum in non-uniform (e.g., bursty) traffic conditions. However, multi-link aggregation may increase spectral utilization (e.g., may increase the bandwidth-time product). Further, multi-link aggregation may enable smooth transitions between multi-band radios (e.g., where each radio may be associated with a given RF band) and/or enable a framework to setup separation of control channels and data channels. Other benefits of multi-link aggregation include reducing the ON time of a modem, which may benefit a wireless device in terms of power consumption (e.g., though the final power-saving gains may in some cases depend on other factors including processing requirements, RF bandwidth, etc.). Another benefit of multi-link aggregation is the increased multiplexing opportunities in the case of a single BSS. That is, multi-link aggregation may increase the number of users per multiplexed transmission served by the multi-link AP 105-a.

However, multi-link aggregation may also have implementation challenges. One such issue arises with use of in-band aggregation (e.g., which may be used to refer to aggregation of links 205 that are proximal or near in frequency such as two links 205 in the lower 5 GHz band). It is to be understood that "in-band aggregation" may in some cases be used to refer to aggregation of links that are not necessarily in the same band but are otherwise close enough in frequency (e.g., experience ACI) that the described techniques still apply. An issue present for in-band aggregation is that of induced ACI. For example, a transmission 210-a (e.g., illustrated as transmission 210-a1) over a channel supported by link 205-a may induce ACI 225 on an adjacent channel supported by link 205-b. Accordingly, transmission 210-b may be unnecessarily delayed because the adjacent channel is incorrectly perceived to be busy starting at time 220. Such complications may lead to lost transmission opportunities and associated reductions in throughput for WLAN 200. That is, in some cases parallel transmissions from a wireless device (e.g., STA 115-a) may conflict such that the device's collision avoidance procedures result in decreased UPT.

In one example, an AP may be capable of supporting more than one link and the STA may not be capable of supporting more than one link. In this case, ACI may result from leakage of signal power from an adjacent channel (e.g., due to inadequate filtering, improper tuning, etc.). ACI may negatively impact a communications system, for example by decreasing throughput on adjacent links or increasing signal processing requirements at communicating devices. Techniques described herein, may be used to alleviate issues caused by such adjacent channel interference.

Similarly, ACI may in some cases be induced due to parallel transmission and reception (e.g., assuming that WLAN 200 supports half-duplex communications). That is, an on-going transmission 210-a2 beginning at time 230 on link 205-a may cause ACI which impacts the ability of a device (e.g., the transmitting device or another device) to receive a transmission 210-b1 over link 205-b. Similarly, a response 240 (e.g., a BA) transmitted upon reception of a transmission 210-b2 may experience interference with a transmission 210-a3 beginning at time 235 on link 205-a. It is to be understood that the ACI examples illustrated with reference to WLAN 200 are included for the sake of explanation. Other ACI causes are considered within the scope of the present disclosure, and all three of the illustrated ACI causes need not be present to experience the benefits of the described techniques.

In accordance with aspects of the present disclosure, techniques that address induced ACI are considered. Techniques, which are discussed in detail below, generally include adjusting a CCA procedure based at least in part on multi-link aggregation operation mode. While aspects of the following are described as uplink (e.g., or downlink) transmissions, it is to be understood that the described techniques may apply to transmissions in either direction, or both directions. By way of example, a radio of STA 115-a may gain access to a channel supported by link 205-a. A second radio of STA 115-a (which may in some cases be the same radio associated with link 205-a) may adjust (e.g., ignore) a CCA procedure for a channel supported by link 205-b and may perform energy detection (ED) before transmitting. Similarly, the radio(s) of STA 115-a may coordinate transmissions (e.g., such that the radio associated with link 205-a may delay transmission until a channel of link 205-b is accessed by the other radio). Additionally or alternatively, the radio associated with link 205-b may adjust a CCA threshold based at least in part on a successful CCA procedure for link 205-a.

In some cases, multi-link aggregation may be supported (including initiated) through signaling between STA 115-a and AP 105-a (or a peer STA 115). For example, STA 115-a may indicate to AP 105-a (or the peer STA 115) whether it supports multi-link aggregation. For example, STA 115-a may indicate that it supports multi-link aggregation in general, for a particular RF spectrum band, for a link 205 of a given RF spectrum band, etc. Various configurations for the indication are considered. For example, the indication could be an explicit yes or no (e.g., a single bit included in a field of a control signal) and/or in the form of a tolerance value. For example, the tolerance value could be a group of bits in the control signal field (e.g., indicating tolerance for parallel communication for links 205-a, 205-b as long as the ACI is below a given threshold). Such signaling could be static (e.g., in the form of beacons, probes, association or reassociation frames, etc.), semi-static, or dynamic (e.g., via OMI or other similar operational parameters). In some cases, AP 105-a (e.g., or the peer STA 115) may decide whether to aggregate communications with STA 115-a based at least in part on its advertised capabilities.

Additionally or alternatively, the signaling used to support multi-link aggregation may include an indication of whether the wireless device (e.g., STA 115-a) supports parallel reception and transmission. For example, STA 115-a may advertise this capability (e.g., via a capability field) in its management frames (e.g., beacons, probes, association or reassociation frames, etc.) as with the static signaling discussed above. Additionally or alternatively, the STA 115-a may indicate the capability dynamically (e.g., may explicitly signal in its ongoing transmissions that it can support parallel reception and transmission, may solicit immediate response (e.g., BA) only if it can support parallel transmission and reception, etc.

Figure 3:
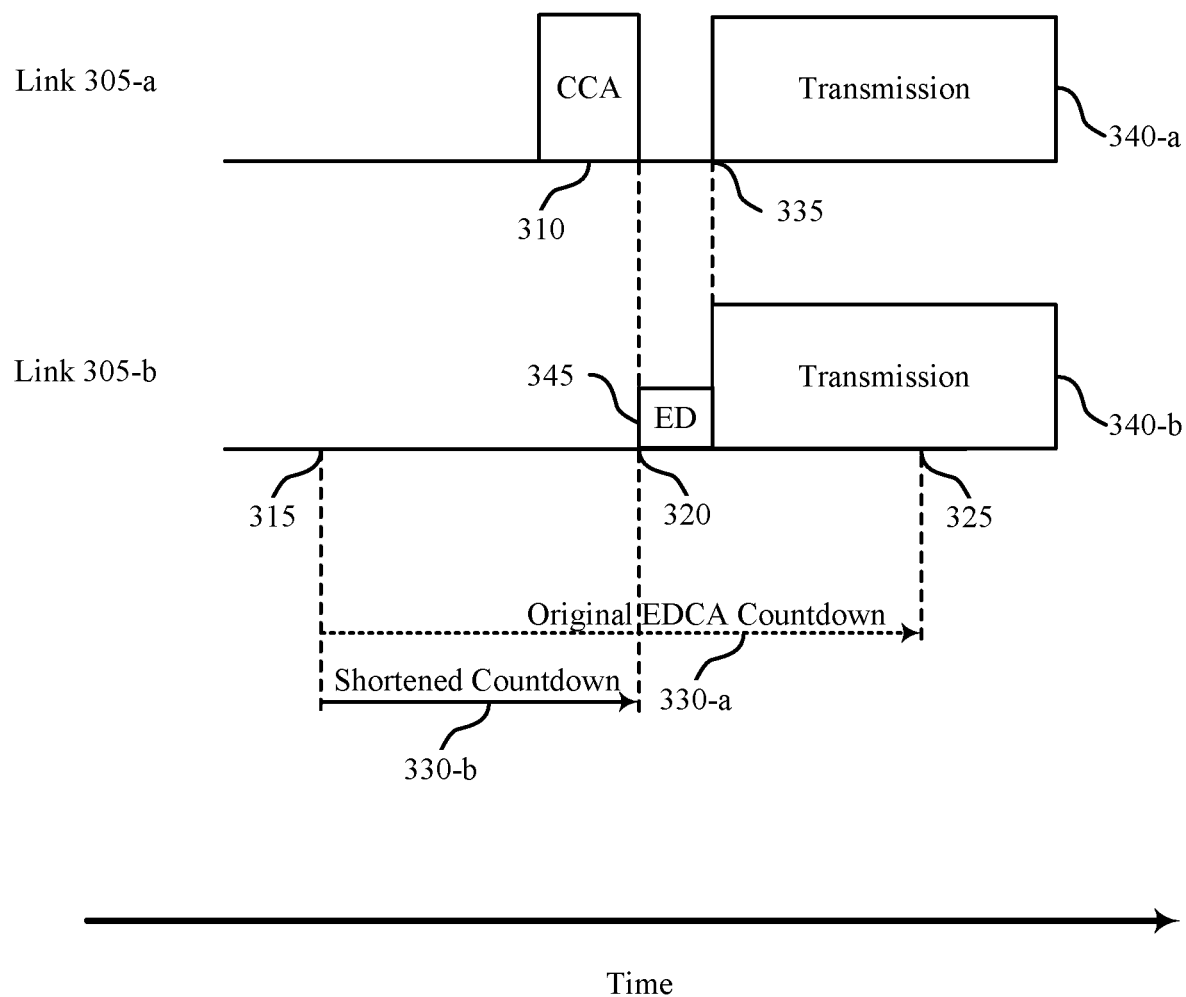
FIGS. 3 through 5 illustrate example transmission schemes that support clear channel assessment adjustment for in-band link aggregation in accordance with aspects of the present disclosure.

FIG. 3 illustrates an example of a transmission scheme 300 that supports clear channel assessment adjustment for in-band link aggregation in accordance with various aspects of the present disclosure. In some examples, transmission scheme 300 may implement aspects of WLAN 100. For example, transmission scheme 300 may apply to a multi-link session between two devices (e.g., an AP 105 and a STA 115). Accordingly, links 305-a, 305-b may be examples of the links described above (e.g., communication link 120 described with reference to FIG. 1). In aspects of the present example, links 305-a, 305-b may support operation over adjacent channels (e.g., each link 305 may be associated with a given RF band). As described above, in some cases each link 305 may be associated with a respective radio of a given wireless device. Alternatively, the links 305 may be associated with the same radio. Thus, while aspects of the following are described as being performed by a wireless device, it is to be understood that separate components of the wireless device may in some cases perform the described techniques for each link 305.

For example, the wireless device may gain access to a channel supported by link 305-a based on successfully completing CCA 310. Based on gaining access to the medium, the device may prepare to transmit transmission 340-a over link 305-a. Additionally, the device may adjust a channel access procedure for link 305-b based at least in part on the success of CCA 310. For example, the device may adjust a channel access countdown (e.g., an enhanced distributed channel access (EDCA) countdown 330) based on the success of CCA 310. That is, the device may be performing EDCA countdown 330-a starting at time 315 and extending to time 325 before attempting to access a channel of link 305-b. However, based on CCA 310, the device may bypass the remainder of the EDCA countdown 330-a (e.g., the portion extending from time 320 to time 325) such that the effective EDCA countdown 330-b for link 305-b is reduced based at least in part on the success of CCA 310. After bypassing the remainder of the EDCA countdown 330-a, the device may perform ED 345 (e.g., starting at time 320). It is to be understood that, while aspects of the present example may be described as occurring simultaneously (e.g., CCA 310 ends at time 320 and ED 345 starts at time 320), there may be small delays or time offsets to account for control signaling or other implementation-based constraints. If ED 345 is below a certain channel access threshold, the device may initiate transmissions 340-a, 340-b over respective links 305-a, 305-b at time 335.

Such an implementation may benefit the wireless device by reducing the potential for self-induced ACI. Furthermore, in cases in which ED 345 detects energy above the channel access threshold, the device may still initiate transmission 340-a over link 305-a at time 335 (e.g., such that the transmission opportunity is not lost because of the unavailability of link 305-b). In some cases, transmission scheme 300 may require synchronized transmissions 340 (e.g., such that the transmissions 340 align with some transmission time boundary such as time 335). Considerations for extending the benefits of transmission scheme 300 to other devices within the BSS are considered. For example, a fairness metric in a listen before talk (LBT) environment may be implemented to ensure that one device does not monopolize or otherwise over-use the medium in periods of high traffic. In some cases, transmission scheme 300 may rely on internal signaling at a wireless device, as described further with reference to FIG. 6.

Figure 4:
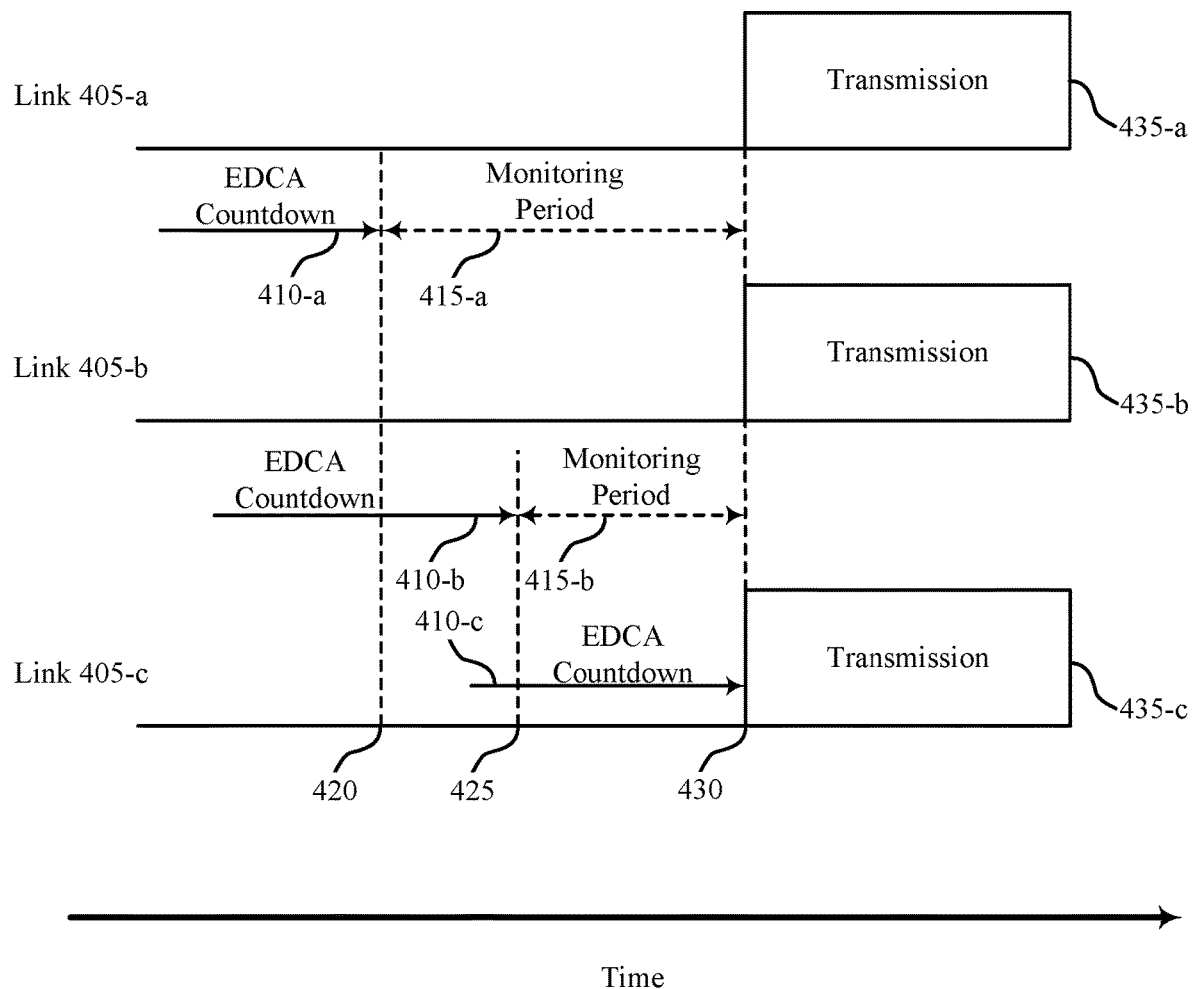

FIG. 4 illustrates an example of a transmission scheme 400 that supports clear channel assessment adjustment for in-band link aggregation in accordance with various aspects of the present disclosure. In some examples, transmission scheme 400 may implement aspects of WLAN 100. For example, transmission scheme 400 may apply to a multi-link session between two devices (e.g., an AP 105 and a STA 115). Accordingly, links 405-a, 405-b, 405-c may be examples of the communication links described above (e.g., communication link 120 described with reference to FIG. 1). In aspects of the present example, links 405-a, 405-b, 405-c may support operation over adjacent channels (e.g., each link 405 may be associated with a given RF band). As described above, in some cases each link 405 may be associated with a respective radio of a given wireless device; alternatively, the links 405 may be associated with the same radio. Thus, while aspects of the following are described as being performed by a wireless device, it is to be understood that separate components of the wireless device may in some cases perform the described techniques for each link 405.

For example, transmission scheme 400 may support operation in which a wireless device waits until all links 405 (e.g., or a subset of the links 405 above some threshold) become available before transmitting. By way of example, the wireless device may gain access to a channel supported by link 405-a at time 420 following EDCA countdown 410-a. However, because the number of available links 405 has not satisfied some (e.g., configurable) threshold (e.g., three links 405 in the present example), the device may refrain from transmitting during monitoring period 415-a. During a monitoring period 415, the device may monitor the medium to ensure that the channel remains idle and/or may transmit a busy signal to reserve the medium until additional links become available.

Similarly, the wireless device may gain access to a channel supported by link 405-b at time 425 following EDCA countdown 410-b. However, because the number of available links 405 is still less than the threshold value, the device may refrain from sending transmission 435-b over the channel during monitoring period 415-b. When the wireless device gains access to a channel supported by link 405-c at time 430 following EDCA countdown 410-c, the device may initiate transmissions 435-a, 435-b, 435-c over respective links 405-a, 405-b, 405-c. As with transmission scheme 300, aspects of transmission scheme 400 may require synchronized transmissions 435. It is to be understood that the example of waiting until three links 405 become available is included for the sake of explanation, and that other implementations are considered within the scope of the present disclosure. Transmission scheme 400 may provide fair channel access to devices within a given overlapping BSS (OBSS), because each device may perform a full EDCA countdown 410 for each link 405 before gaining access to the medium. In some cases, transmission scheme 400 may rely on internal signaling at a wireless device, as described further with reference to FIG. 6.

Figure 5:
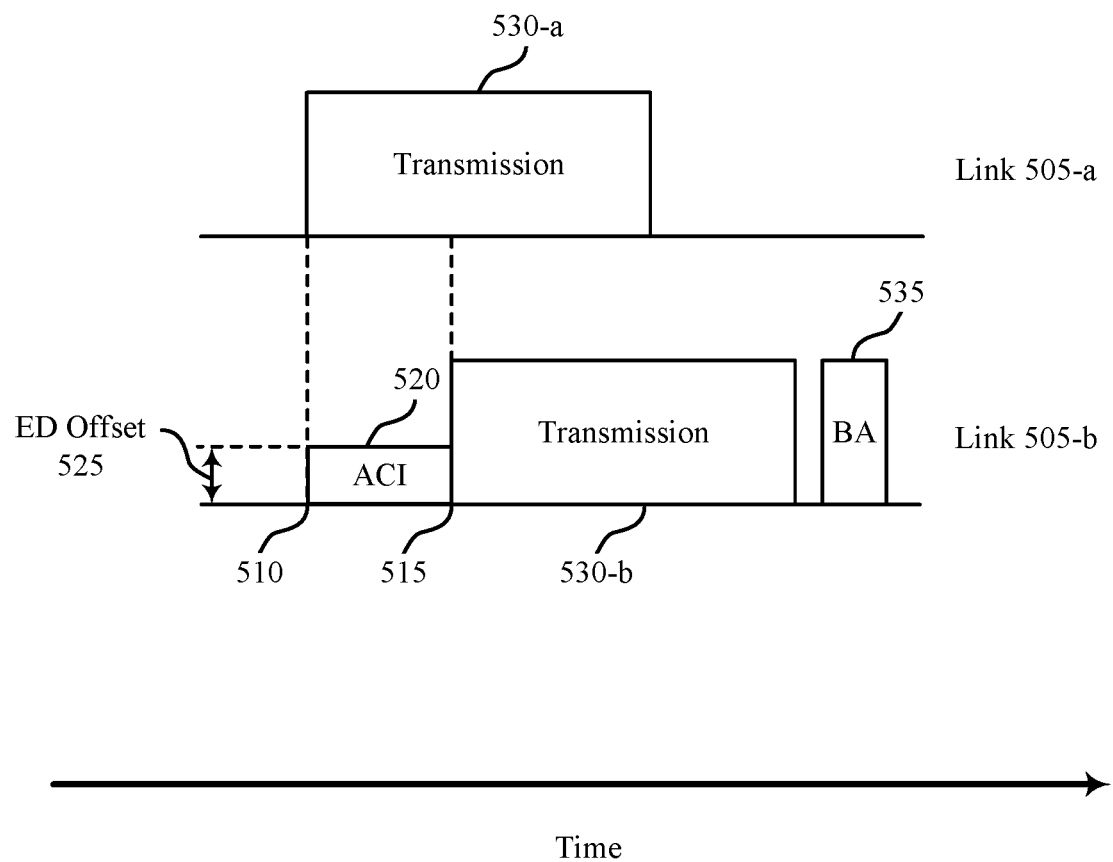

FIG. 5 illustrates an example of a transmission scheme 500 that supports clear channel assessment adjustment for in-band link aggregation in accordance with various aspects of the present disclosure. In some examples, transmission scheme 500 may implement aspects of WLAN 100. For example, transmission scheme 500 may apply to a multi-link session between two devices (e.g., an AP 105 and a STA 115). Accordingly, links 505-a, 505-b may be examples of the communication links described above (e.g., communication link 120 described with reference to FIG. 1). In aspects of the present example, links 505-a, 505-b may support operation over adjacent channels (e.g., each link 505 may be associated with a given RF band). As described above, in some cases each link 505 may be associated with a respective radio of a given wireless device. Alternatively, the links 505 may be associated with the same radio. Thus, while aspects of the following are described as being performed by a wireless device, it is to be understood that separate components of the wireless device may in some cases perform the described techniques for each link 505.

Generally, transmission scheme 500 may provide for internal signaling at a wireless device to support coordination of a multi-link session. That is, when the device gains access to a given link (e.g., link 505-a), the device may initiate a transmission (e.g., transmission 530-a at time 510) on that link and internally signal a MAC layer of one or more other in-band links (e.g., link 505-b). For example, each link 505-a, 505-b may be associated with a respective lower MAC layer at the wireless device. The internal signaling may thus be provided directly from the lower MAC layer of link 505-a to the lower MAC layer of link 505-b, or may be relayed (e.g., by an upper MAC layer that controls operation of the lower MAC layers).

As described with reference to FIG. 2, transmission 530-a may generate ACI 520 on link 505-b beginning at time 510. However, based on the coordination between the lower MAC layers, the device may determine a channel interference value based on transmission 530-a. Accordingly, the device may adjust, based at least in part on the determined channel interference value, a level of the channel availability threshold to use during a CCA procedure for a channel of link 505-b. For example, the device may apply an ED offset 525 to the CCA procedure for link 505-b to compensate for the ACI 520. After performing an EDCA countdown for link 505-b, the device may initiate transmission 530-b at time 515 (e.g., if the medium is idle after accounting for the adjusted CCA threshold). Aspects of transmission scheme 500 may support asynchronous transmissions. In some cases, transmission 530-b may elicit block acknowledgement 535.

Various considerations for supporting independent transmissions on each link 505 based on adjusted CCA procedures are included within the scope of the present disclosure. For example, the offset for raising the CCA threshold (e.g., the channel availability threshold) may depend on various factors including a tolerance number, a frequency separation between the first wireless channel and the second wireless channel, a separation between two or more antennas of the wireless device, any combination thereof, etc. Further, in some cases a device such as a STA 115 may signal a device capability in support of the described techniques. The device capability may include support for parallel transmission and reception (e.g., such that the device may solicit immediate response such as block acknowledgement 535 only if it can support parallel transmission and reception). In some cases, transmission scheme 400 may rely on internal signaling at a wireless device, as described further with reference to FIG. 6.

Figure 6:
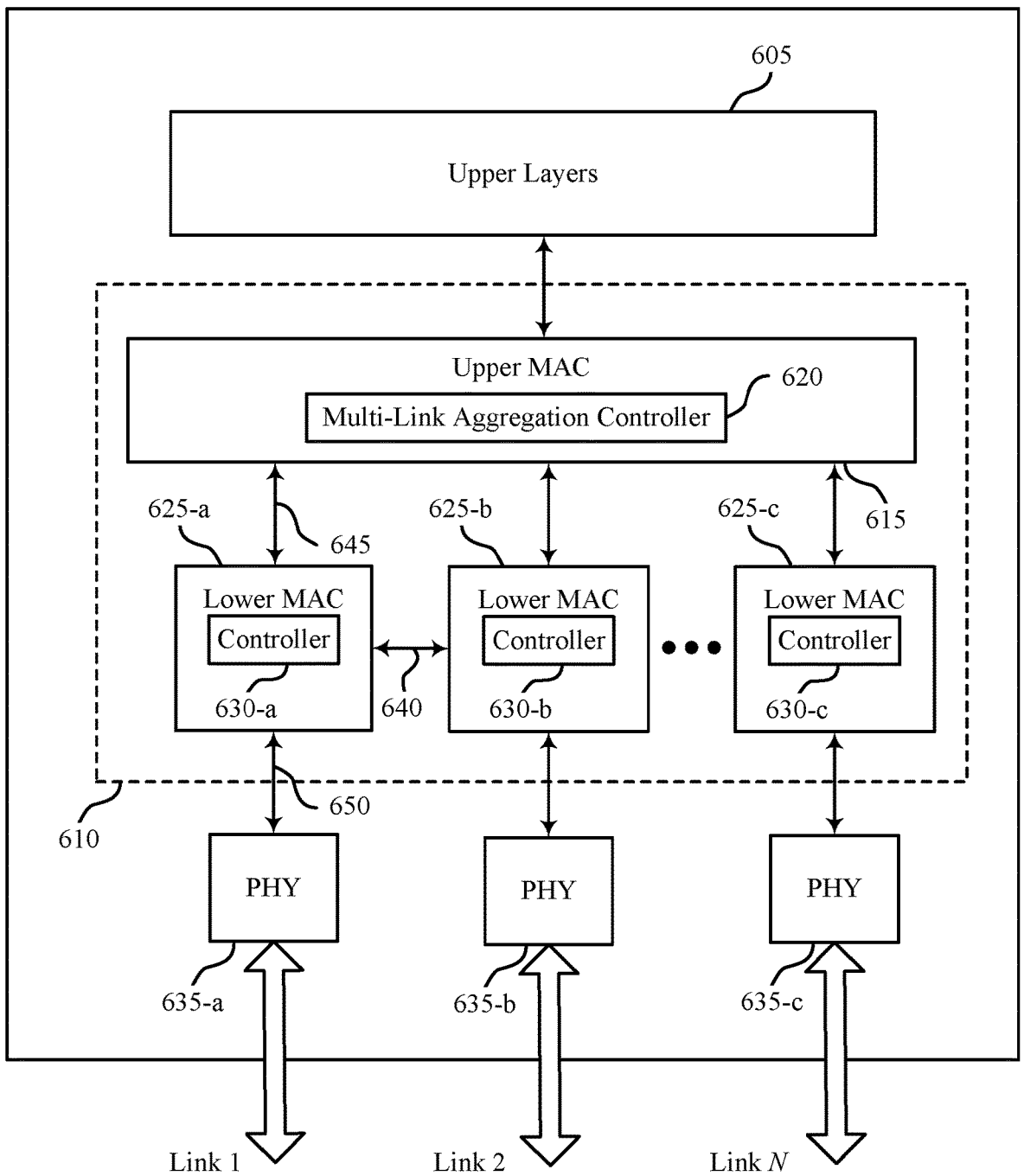
FIG. 6 illustrates an example layer configuration that supports clear channel assessment adjustment for in-band link aggregation in accordance with aspects of the present disclosure.

FIG. 6 illustrates an example layer configuration 600 that supports clear channel assessment adjustment for in-band link aggregation in accordance with aspects of the present disclosure. Layer configuration 600 may apply to a STA 115 or an AP 105, and be for a transmitting wireless device, or a receiving wireless device. It is to be understood that aspects of layer configuration 600 may represent logical constructs (e.g., such that components of layer configuration 600 may share hardware components). A wireless device may support layer configuration 600 through the use of various hardware configurations described herein.

As illustrated, layer configuration 600 may include upper layers 605, a MAC layer 610, and one or more PHY layers 635 (e.g., where each PHY layer 635 may in some cases be associated with a respective link or channel). MAC layer 610 may be further divided into upper MAC 615 and lower MACs 625-a, 625-b, 625-c. While three lower MACs 625 are illustrated, it is to be understood that upper MAC 615 may control (e.g., via multi-link aggregation controller 620) any suitable number of lower MACs 625. Signaling between a given lower MAC (e.g., lower MAC 625-a) and upper MAC 615 may be carried by connection 645. Similarly, signaling between lower MAC 625-a and PHY layer 635-a may be carried by connection 650 and signaling between lower MAC 625-a and lower MAC 625-b may be carried by connection 640. As described below, the signaling for lower MACs 625-a, 625-b, 625-c may be based on logic associated with respective controllers 630-a, 630-b, 630-c.

With reference to FIGS. 3 and 6, lower MAC 625-a may be associated with link 305-a (e.g., via PHY layer 635-a) and lower MAC 625-b may be associated with link 305-b (e.g., via PHY layer 635-b). Lower MACs 625-a, 625-b may independently perform EDCA countdowns on respective links 305-a, 305-b. For example, lower MAC 625-b may perform original EDCA countdown 330-a and lower MAC 625-a may independently perform an EDCA countdown (e.g., prior to CCA 310). Upon completion of its EDCA countdown, lower MAC 625-a may detect an idle medium (e.g., based on CCA 310) and inform an internal controller entity (e.g., multi-link aggregation controller 620) that it is ready to initiate transmission 340-a. Upon receiving the indication (e.g., at time 320), multi-link aggregation controller 620 may signal the other lower MACs (e.g., lower MAC 625-b) to stop their countdowns (e.g., original EDCA countdown 330-a) and perform ED 345. Additionally, multi-link aggregation controller 620 may prepare transmission 340-a (e.g., may coordinate one or more PPDUs to be transmitted on link 305-a). To support efficient use of link 305-a (e.g., such that the wireless device does not lose access to the medium to another STA 115 in the OBSS), considerations for speed of signaling between multi-link aggregation controller 620 and the lower MAC 625 of each link. In some cases, direct signaling (e.g., over connection 640) between lower MACs 625-a, 625-b) may be employed. In some cases, the signaling may be between multiple lower MACs 625 (e.g., many-to-many). Considerations for a new EDCA scheme in accordance with the described techniques to account for OBSS fairness are included. For example, a token-based system may be used to ensure that a device does not unfairly monopolize communication resources.

With reference to FIGS. 4 and 6, each lower MAC 625-a, 625-b, 625-c may independently countdown on its respective link 405-a, 405-b, 405-c. Upon detecting an idle medium (e.g., at time 420 for link 405-a, time 425 for link 405-b, and time 430 for link 405-c), each respective lower MAC 625 may inform multi-link aggregation controller 620 that it is ready to initiate transmission 435. Multi-link aggregation controller 620 may maintain a count of a number of available links 405. While the count is below the threshold (e.g., three in the present example), multi-link aggregation controller 620 may continue to poll for available links 405. If one of the available links 405 becomes busy, the counter may be decremented. When the counter crosses the threshold, multi-link aggregation controller 620 may prepare transmissions 435-a, 435-b, 435-c for respective links 405.

With reference to FIGS. 5 and 6, lower MACs 625-a, 625-b may independently countdown on respective links 505-a, 505-b. Upon detecting an idle medium (e.g., at time 510 for link 505-a), lower MAC 625-a may inform multi-link aggregation controller 620 that it is ready to initiate transmission 530-a. Upon receiving the indication, multi-link aggregation controller 620 may transmission 530-a (e.g., may coordinate PPDU preparation) and may signal lower MAC 625-b to adjust its channel availability threshold based on some channel interference value (e.g., ED offset 525). In some cases, layer configuration 600 may support independent transmissions 530 on each link 505 with adjusted channel access procedures. For example, the offset of a given link 505 may depend on one or more factors as described above (e.g., frequency separation between links, physical antenna separation, etc.). In some cases, ACI between links 505-a, 505-b may be computed based on a formula that considers transmission power on a given link 505, antenna separation, link separation, etc. For example, a wireless device may perform a calibration step when Wi-Fi is turned ON to determine the ACI between different links 505. Alternatively, the wireless device may semi-statically determine the ACI (e.g., using some discontinuous reception configuration). For example, the ACI between links may be additive. That is, when link 505-a becomes available, ED offset 525 for link 505-b is x dB and when another link 505 becomes available, ED offset 525 for link 505-b is y dB, and when both links are available, ED offset 525 is a function of the sum of x and y.

Figure 7:
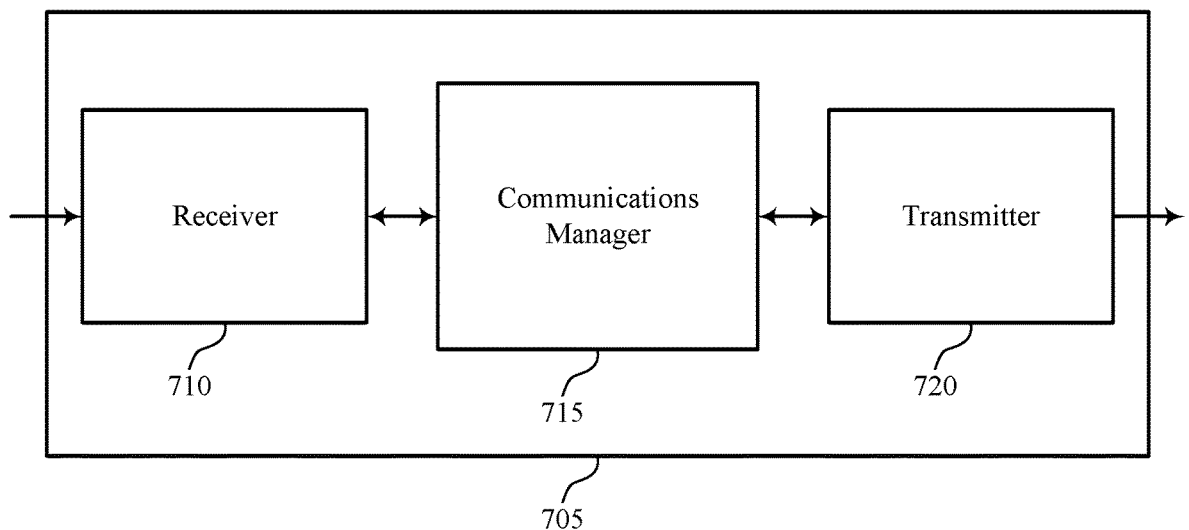
FIGS. 7 through 9 show block diagrams of a device that supports clear channel assessment adjustment for in-band link aggregation in accordance with aspects of the present disclosure.

FIG. 7 shows a block diagram 700 of a wireless device 705 that supports clear channel assessment adjustment for in-band link aggregation in accordance with aspects of the present disclosure. Wireless device 705 may be an example of aspects of a STA 115 or an AP 105 as described herein. Wireless device 705 may include receiver 710, communications manager 715, and transmitter 720. Wireless device 705 may also include one or more processors, memory coupled with the one or more processors, and instructions stored in the memory that are executable by the one or more processors to enable the one or more processors to perform the features discussed herein. Each of these components may be in communication with one another (e.g., via one or more buses).

Receiver 710 may receive information such as packets, user data, or control information associated with various information channels (e.g., control channels, data channels, and information related to clear channel assessment adjustment for in-band link aggregation, etc.). Information may be passed on to other components of the device. The receiver 710 may be an example of aspects of the transceiver 1035 described with reference to FIG. 10. The receiver 710 may utilize a single antenna or a set of antennas.

Communications manager 715 may be an example of aspects of the communications manager 1015 described with reference to FIG. 10. Communications manager 715 and/or at least some of its various sub-components may be implemented in hardware, software executed by a processor, firmware, or any combination thereof. If implemented in software executed by a processor, the functions of the communications manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The communications manager 715 and/or at least some of its various sub-components may be physically located at various positions, including being distributed such that portions of functions are implemented at different physical locations by one or more physical devices. In some examples, communications manager 715 and/or at least some of its various sub-components may be a separate and distinct component in accordance with various aspects of the present disclosure. In other examples, communications manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 715 may establish a set of wireless links between the first wireless device and a second wireless device, the set of wireless links supporting parallel transmission over the set of wireless links during at least a first duration of a multi-link session, the set of wireless links including at least a first wireless link and a second wireless link. Communications manager 715 may identify a parameter value modifying a channel availability threshold to use during a CCA procedure for a first wireless channel of the first wireless link based on a presence of the second wireless link. Communications manager 715 may perform the CCA procedure for the first wireless channel based on the identified parameter value.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

Figure 8:
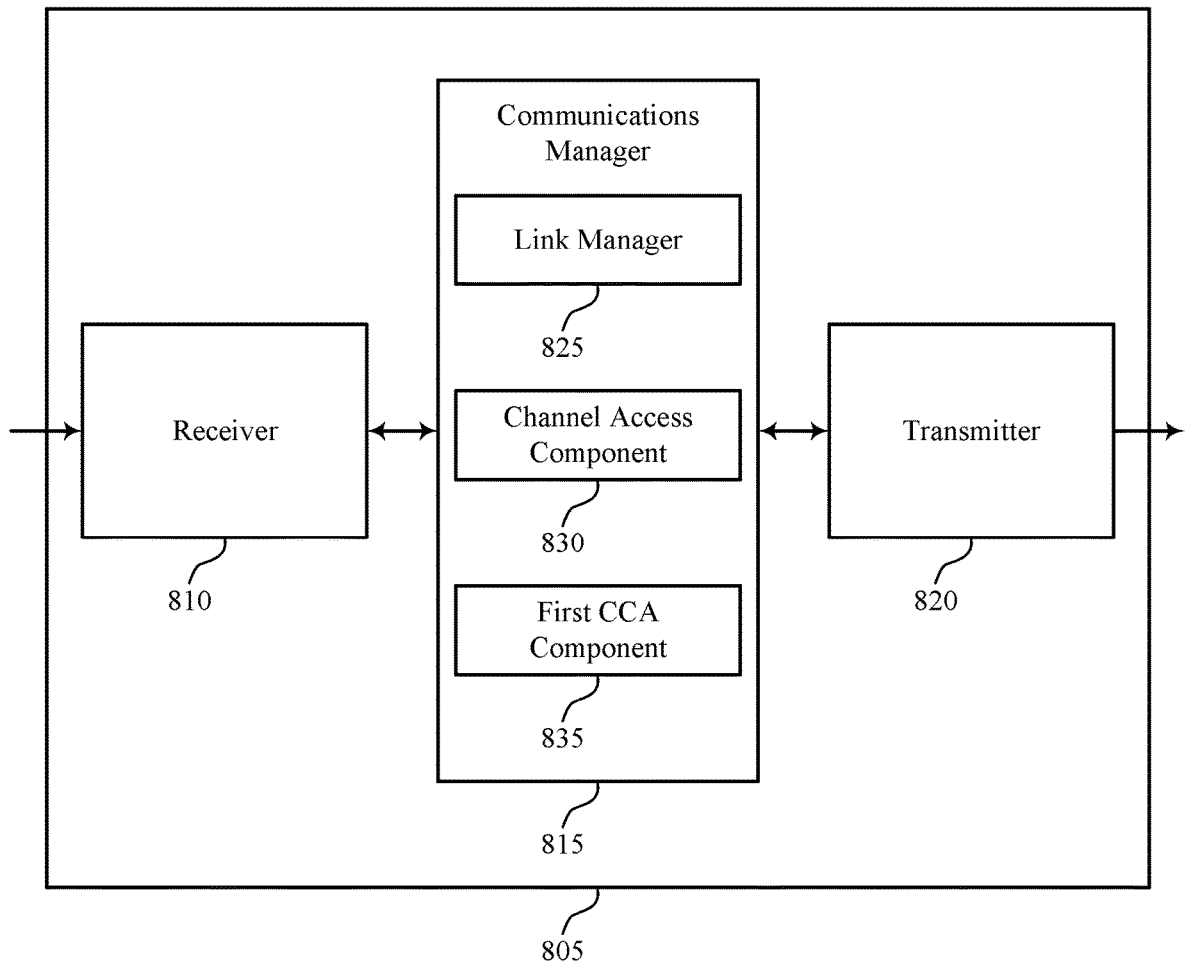

FIG. 8 shows a block diagram 800 of a wireless device 805 that supports clear channel assessment adjustment for in-band link aggregation in accordance with aspects of the present disclosure. Wireless device 805 may be an example of aspects of a wireless device 705 or a STA 115 or an AP 105 as described with reference to FIG. 7. Wireless device 805 may include receiver 810, communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to clear channel assessment adjustment for in-band link aggregation, etc.). Information may be passed on to other components of the device. The receiver 810 may be an example of aspects of the transceiver 1035 described with reference to FIG. 10. The receiver 810 may utilize a single antenna or a set of antennas.

Communications manager 815 may be an example of aspects of the communications manager 1015 described with reference to FIG. 10. Communications manager 815 may also include link manager 825, channel access component 830, and first CCA component 835.

Link manager 825 may establish a set of wireless links between wireless device 805 and a second wireless device, the set of wireless links supporting parallel transmission over the set of wireless links during at least a first duration of a multi-link session, the set of wireless links including at least a first wireless link and a second wireless link. Link manager 825 may identify, at a first lower MAC layer of wireless device 805 for the first wireless link, the presence of the second wireless link based on an indication received from a second lower MAC layer of wireless device 805 for the second wireless link. Link manager 825 may identify, at a first lower MAC layer of wireless device 805 for the first wireless link, the presence of the second wireless link based on an indication received from an upper MAC layer of wireless device 805. In some cases, the first wireless link includes the first wireless channel in a first RF spectrum band. In some cases, the second wireless link includes a second wireless channel in the first RF spectrum band or a second RF spectrum band.

Channel access component 830 may identify a parameter value modifying a channel availability threshold to use during a CCA procedure for a first wireless channel of the first wireless link based on a presence of the second wireless link. Channel access component 830 may bypass a channel access countdown for the first wireless channel based on identifying that the second wireless channel is clear. Channel access component 830 may adjust, based on the determined channel interference value, a level of the channel availability threshold to use during the CCA procedure for the first wireless channel. Channel access component 830 may adjust the level of the channel availability threshold to use during the CCA procedure is further based on a tolerance number, or a frequency separation between the first wireless channel and the second wireless channel, or a separation between two or more antennas of wireless device 805, or a combination thereof. In some cases, identifying the parameter value includes identifying, based on the presence of the second wireless link, a level of the channel availability threshold to be used during the CCA procedure for the first wireless channel. In some cases, identifying the parameter value includes determining a channel interference value for the first wireless channel based on transmissions on a second wireless channel of the second wireless link. In some cases, adjusting the level of the channel availability threshold to use during the CCA procedure includes applying an energy detection offset to the channel availability threshold.

First CCA component 835 may perform the CCA procedure for the first wireless channel following the channel access countdown for the second wireless channel, where the parameter value modifying the channel availability threshold includes the channel access countdown for the second wireless channel. First CCA component 835 may perform the CCA procedure for the first wireless channel based on the identified parameter value. First CCA component 835 may perform a channel access countdown for the first wireless channel.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
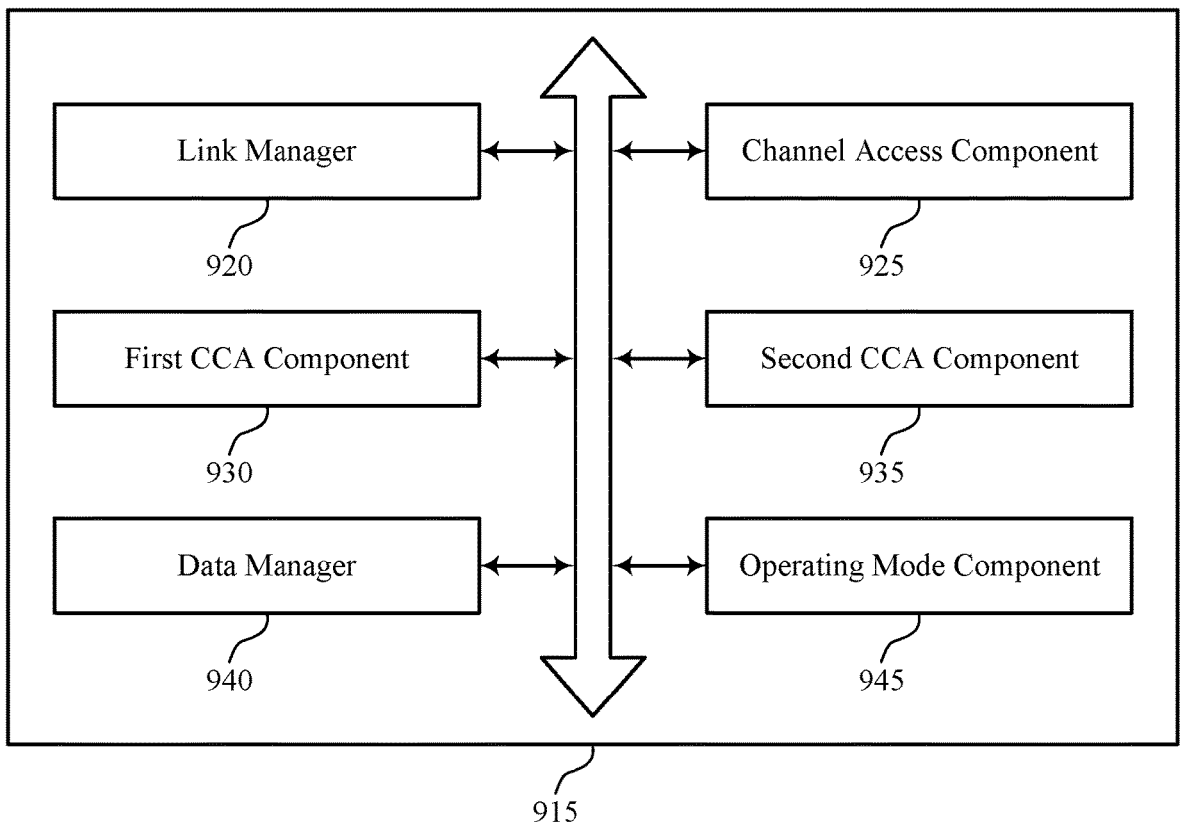

FIG. 9 shows a block diagram 900 of a communications manager 915 that supports clear channel assessment adjustment for in-band link aggregation in accordance with aspects of the present disclosure. The communications manager 915 may be an example of aspects of a communications manager 715, a communications manager 815, or a communications manager 1015 described with reference to FIGS. 7, 8, and 10. The communications manager 915 may include link manager 920, channel access component 925, first CCA component 930, second CCA component 935, data manager 940, and operating mode component 945. Each of these modules may communicate, directly or indirectly, with one another (e.g., via one or more buses).

Link manager 920 may establish a set of wireless links between the first wireless device and a second wireless device, the set of wireless links supporting parallel transmission over the set of wireless links during at least a first duration of a multi-link session, the set of wireless links including at least a first wireless link and a second wireless link. Link manager 920 may identify, at a first lower MAC layer of the first wireless device for the first wireless link, the presence of the second wireless link based on an indication received from a second lower MAC layer of the first wireless device for the second wireless line. In some cases, link manager 920 may identify, at a first lower MAC layer of the first wireless device for the first wireless link, the presence of the second wireless link based on an indication received from an upper MAC layer of the first wireless device. In some cases, the first wireless link includes the first wireless channel in a first RF spectrum band. In some cases, the second wireless link includes a second wireless channel in the first RF spectrum band or a second RF spectrum band.

Channel access component 925 may identify a parameter value modifying a channel availability threshold to use during a CCA procedure for a first wireless channel of the first wireless link based on a presence of the second wireless link. Channel access component 925 may bypass a channel access countdown for the first wireless channel based on identifying that the second wireless channel is clear. Channel access component 925 may adjust, based on the determined channel interference value, a level of the channel availability threshold to use during the CCA procedure for the first wireless channel. Channel access component 925 may adjust the level of the channel availability threshold to use during the CCA procedure is further based on a tolerance number, or a frequency separation between the first wireless channel and the second wireless channel, or a separation between two or more antennas of the first wireless device, or a combination thereof. In some cases, identifying the parameter value includes identifying, based on the presence of the second wireless link, a level of the channel availability threshold to be used during the CCA procedure for the first wireless channel. In some cases, identifying the parameter value includes determining a channel interference value for the first wireless channel based on transmissions on a second wireless channel of the second wireless link. In some cases, adjusting the level of the channel availability threshold to use during the CCA procedure includes applying an energy detection offset to the channel availability threshold.

First CCA component 930 may perform the CCA procedure for the first wireless channel following the channel access countdown for the second wireless channel, where the parameter value modifying the channel availability threshold includes the channel access countdown for the second wireless channel. First CCA component 930 may perform the CCA procedure for the first wireless channel based on the identified parameter value. First CCA component 930 may perform a channel access countdown for the first wireless channel.

Second CCA component 935 may identify that a second wireless channel of the second wireless link is clear based on a second CCA procedure. Second CCA component 935 may perform a channel access countdown for a second wireless channel of the second wireless link. Second CCA component 935 may perform a second CCA procedure for the second wireless channel of the second wireless link following the channel access countdown for the second wireless channel.

Data manager 940 may communicate using the second wireless channel of the second wireless link based on the second CCA procedure indicating that energy detected on the second wireless channel is below a second channel availability threshold, transmissions on the second wireless channel synchronized with transmissions on the first wireless channel. Data manager 940 may communicate on the first wireless channel and the second wireless channel based on the second CCA procedure indicating the second wireless channel is clear. Data manager 940 may communicate on the first wireless channel following the channel access countdown based on the CCA procedure using the adjusted channel availability threshold level indicating that the first wireless channel is clear.

Operating mode component 945 may receive, from the second wireless device, an OMI indicating a capability of the second wireless device to support the parallel transmission over the set of wireless links, where the set of wireless links between the first wireless device and the second wireless device are established based on the received OMI.

Figure 10:
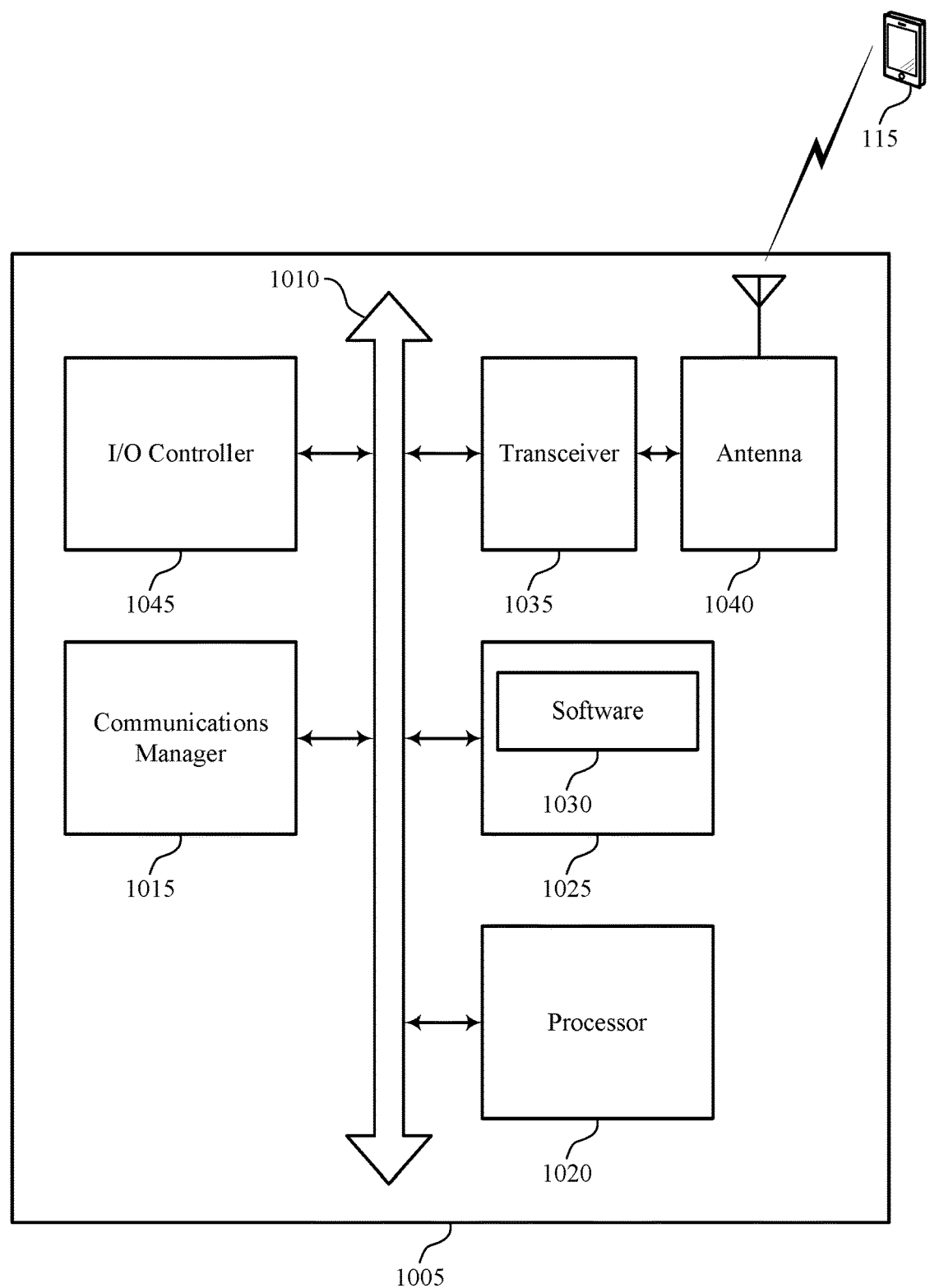
FIG. 10 illustrates a block diagram of a system including a wireless device that supports clear channel assessment adjustment for in-band link aggregation in accordance with aspects of the present disclosure.

FIG. 10 shows a diagram of a system 1000 including a device 1005 that supports clear channel assessment adjustment for in-band link aggregation in accordance with aspects of the present disclosure. Device 1005 may be an example of or include the components of wireless device 705, wireless device 805, or a STA 115 or an AP 105 as described above, e.g., with reference to FIGS. 7 and 8. Device 1005 may include components for bi-directional voice and data communications including components for transmitting and receiving communications, including communications manager 1015, processor 1020, memory 1025, software 1030, transceiver 1035, antenna 1040, and I/O controller 1045. These components may be in electronic communication via one or more buses (e.g., bus 1010).

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting clear channel assessment adjustment for in-band link aggregation).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

Software 1030 may include code to implement aspects of the present disclosure, including code to support clear channel assessment adjustment for in-band link aggregation. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system. In other cases, I/O controller 1045 may represent or interact with a modem, a keyboard, a mouse, a touchscreen, or a similar device. In some cases, I/O controller 1045 may be implemented as part of a processor. In some cases, a user may interact with device 1005 via I/O controller 1045 or via hardware components controlled by I/O controller 1045.

Figure 11:
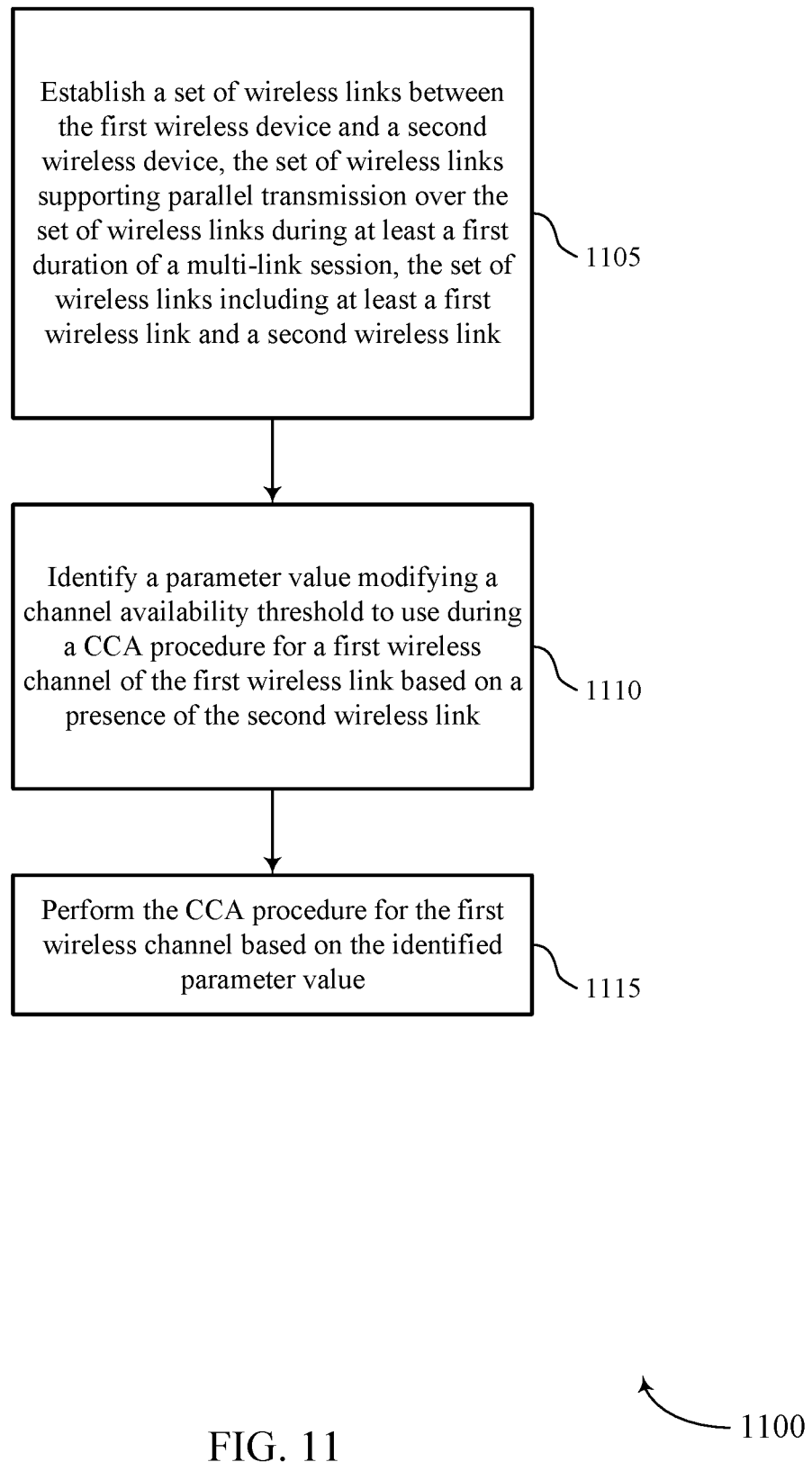
FIGS. 11 through 17 illustrate methods for clear channel assessment adjustment for in-band link aggregation in accordance with aspects of the present disclosure.

FIG. 11 shows a flowchart illustrating a method 1100 for clear channel assessment adjustment for in-band link aggregation in accordance with aspects of the present disclosure. The operations of method 1100 may be implemented by a STA 115 or an AP 105 or its components as described herein. For example, the operations of method 1100 may be performed by a communications manager as described with reference to FIGS. 7 through 10. In some examples, a STA 115 or an AP 105 may execute a set of codes to control the functional elements of the device to perform the functions described below. Additionally or alternatively, the STA 115 or an AP 105 may perform aspects of the functions described below using special-purpose hardware.

At 1105 the STA 115 or an AP 105 may establish a plurality of wireless links between the first wireless device and a second wireless device, the plurality of wireless links supporting parallel transmission over the plurality of wireless links during at least a first duration of a multi-link session, the plurality of wireless links including at least a first wireless link and a second wireless link. The operations of 1105 may be performed according to the methods described herein. In certain examples, aspects of the operations of 1105 may be performed by a link manager as described with reference to FIGS. 7 through 10.

At 1110 the STA 115 or an AP 105 may identify a parameter value modifying a channel availability threshold to use during a CCA procedure for a first wireless channel of the first wireless link based at least in part on a presence of the second wireless link. The operations of 1110 may be performed according to the methods described herein. In certain examples, aspects of the operations of 1110 may be performed by a channel access component as described with reference to FIGS. 7 through 10.

At 1115 the STA 115 or an AP 105 may perform the CCA procedure for the first wireless channel based at least in part on the identified parameter value. The operations of 1115 may be performed according to the methods described herein. In certain examples, aspects of the operations of 1115 may be performed by a first CCA component as described with reference to FIGS. 7 through 10.

Figure 12:
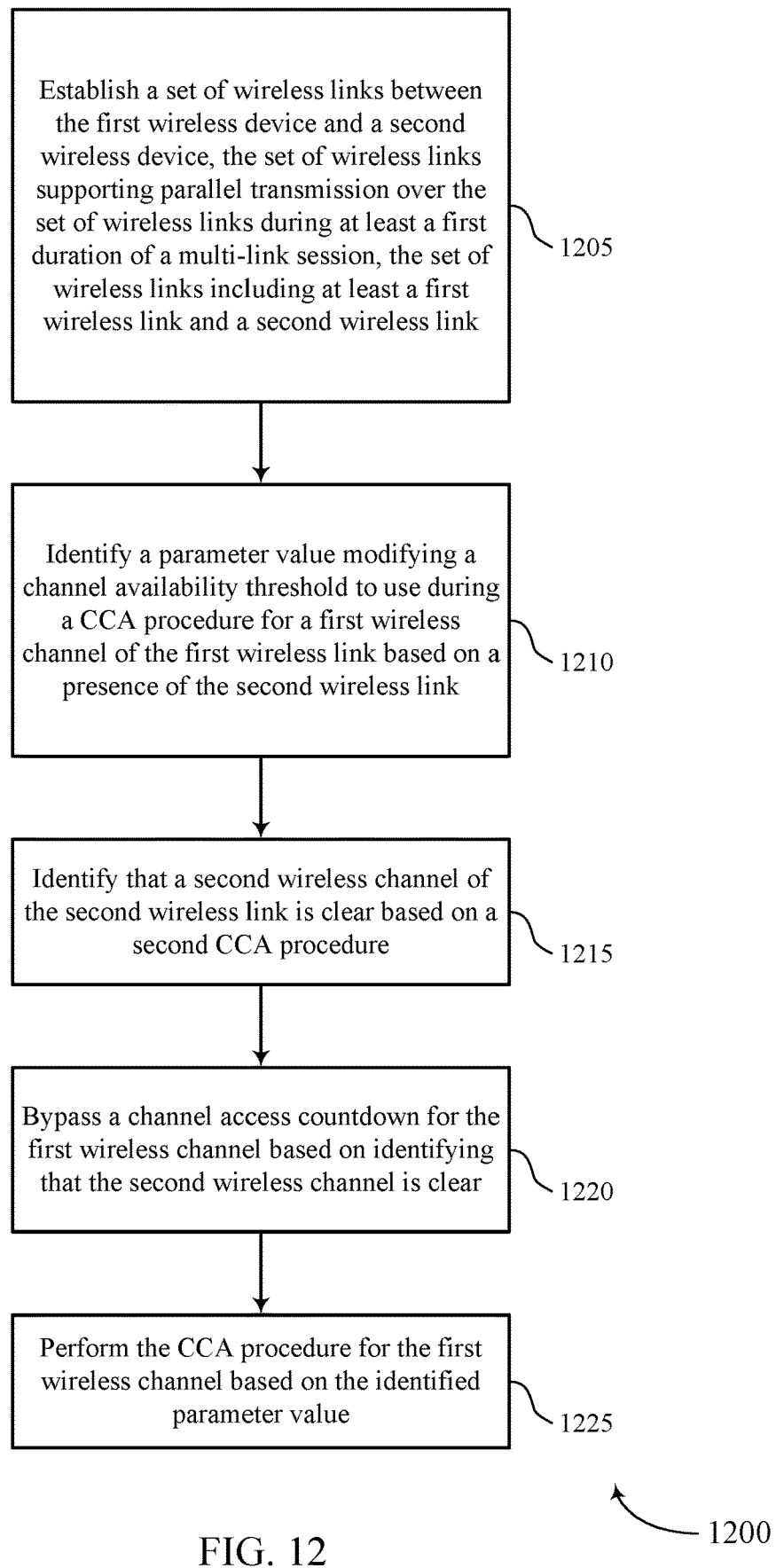

FIG. 12 shows a flowchart illustrating a method 1200 for clear channel assessment adjustment for in-band link aggregation in accordance with aspects of the present disclosure. The operations of method 1200 may be implemented by a STA 115 or an AP 105 or its components as described herein. For example, the operations of method 1200 may be performed by a communications manager as described with reference to FIGS. 7 through 10. In some examples, a STA 115 or an AP 105 may execute a set of codes to control the functional elements of the device to perform the functions described below. Additionally or alternatively, the STA 115 or an AP 105 may perform aspects of the functions described below using special-purpose hardware.

At 1205 the STA 115 or an AP 105 may establish a plurality of wireless links between the first wireless device and a second wireless device, the plurality of wireless links supporting parallel transmission over the plurality of wireless links during at least a first duration of a multi-link session, the plurality of wireless links including at least a first wireless link and a second wireless link. The operations of 1205 may be performed according to the methods described herein. In certain examples, aspects of the operations of 1205 may be performed by a link manager as described with reference to FIGS. 7 through 10.

At 1210 the STA 115 or an AP 105 may identify a parameter value modifying a channel availability threshold to use during a CCA procedure for a first wireless channel of the first wireless link based at least in part on a presence of the second wireless link. The operations of 1210 may be performed according to the methods described herein. In certain examples, aspects of the operations of 1210 may be performed by a channel access component as described with reference to FIGS. 7 through 10.

At 1215 the STA 115 or an AP 105 may identify that a second wireless channel of the second wireless link is clear based at least in part on a second CCA procedure. The operations of 1215 may be performed according to the methods described herein. In certain examples, aspects of the operations of 1215 may be performed by a second CCA component as described with reference to FIGS. 7 through 10.

At 1220 the STA 115 or an AP 105 may bypass a channel access countdown for the first wireless channel based at least in part on identifying that the second wireless channel is clear. The operations of 1220 may be performed according to the methods described herein. In certain examples, aspects of the operations of 1220 may be performed by a channel access component as described with reference to FIGS. 7 through 10.

At 1225 the STA 115 or an AP 105 may perform the CCA procedure for the first wireless channel based at least in part on the identified parameter value. The operations of 1225 may be performed according to the methods described herein. In certain examples, aspects of the operations of 1225 may be performed by a first CCA component as described with reference to FIGS. 7 through 10.

Figure 13:
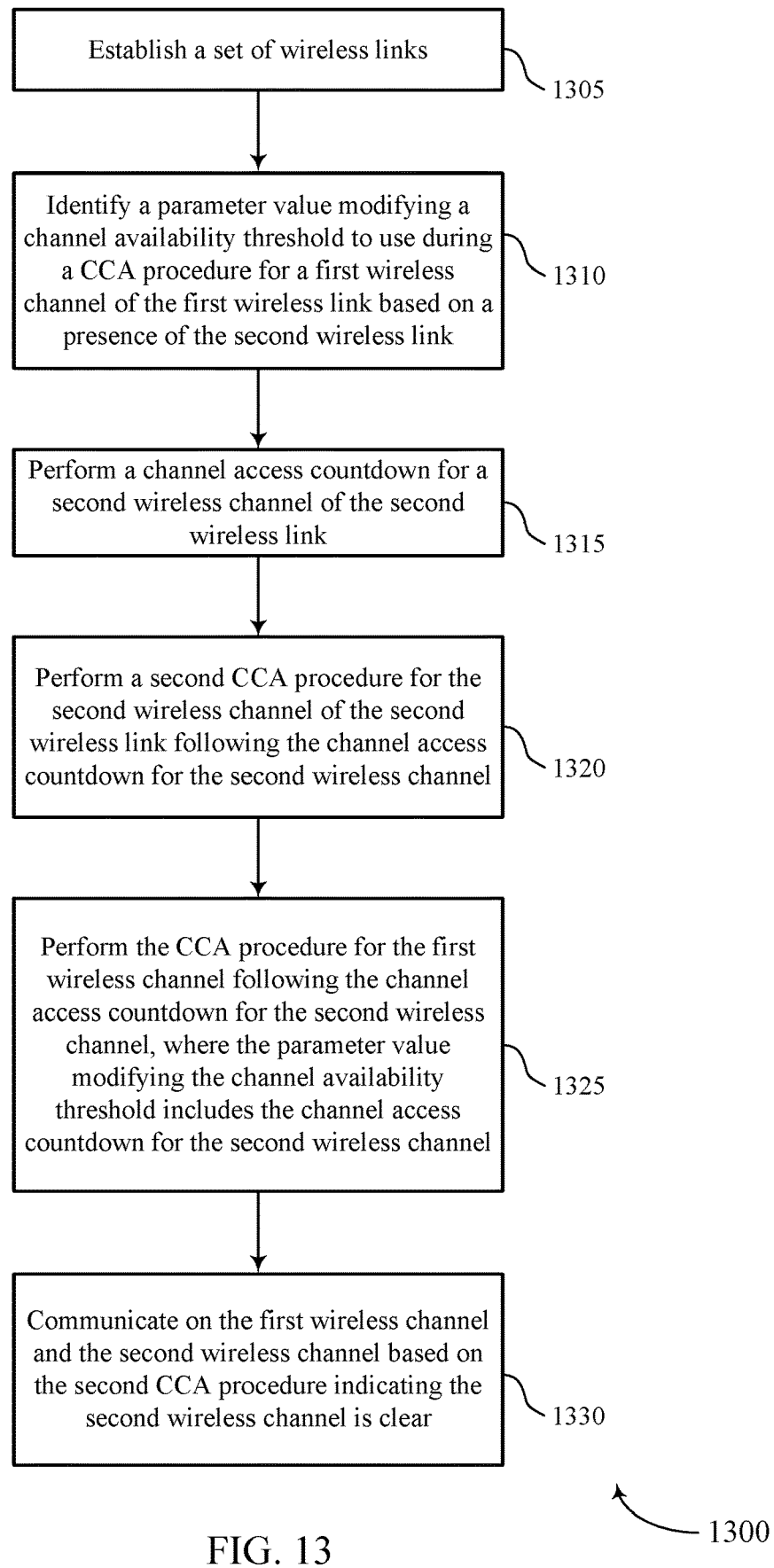

FIG. 13 shows a flowchart illustrating a method 1300 for clear channel assessment adjustment for in-band link aggregation in accordance with aspects of the present disclosure. The operations of method 1300 may be implemented by a STA 115 or an AP 105 or its components as described herein. For example, the operations of method 1300 may be performed by a communications manager as described with reference to FIGS. 7 through 10. In some examples, a STA 115 or an AP 105 may execute a set of codes to control the functional elements of the device to perform the functions described below. Additionally or alternatively, the STA 115 or an AP 105 may perform aspects of the functions described below using special-purpose hardware.

At 1305 the STA 115 or an AP 105 may establish a plurality of wireless links between the first wireless device and a second wireless device, the plurality of wireless links supporting parallel transmission over the plurality of wireless links during at least a first duration of a multi-link session, the plurality of wireless links including at least a first wireless link and a second wireless link. The operations of 1305 may be performed according to the methods described herein. In certain examples, aspects of the operations of 1305 may be performed by a link manager as described with reference to FIGS. 7 through 10.

At 1310 the STA 115 or an AP 105 may identify a parameter value modifying a channel availability threshold to use during a CCA procedure for a first wireless channel of the first wireless link based at least in part on a presence of the second wireless link. The operations of 1310 may be performed according to the methods described herein. In certain examples, aspects of the operations of 1310 may be performed by a channel access component as described with reference to FIGS. 7 through 10.

At 1315 the STA 115 or an AP 105 may perform a channel access countdown for a second wireless channel of the second wireless link. The operations of 1315 may be performed according to the methods described herein. In certain examples, aspects of the operations of 1315 may be performed by a second CCA component as described with reference to FIGS. 7 through 10.

At 1320 the STA 115 or an AP 105 may perform a second CCA procedure for the second wireless channel of the second wireless link following the channel access countdown for the second wireless channel. The operations of 1320 may be performed according to the methods described herein. In certain examples, aspects of the operations of 1320 may be performed by a second CCA component as described with reference to FIGS. 7 through 10.

At 1325 the STA 115 or an AP 105 may perform the CCA procedure for the first wireless channel following the channel access countdown for the second wireless channel, where the parameter value modifying the channel availability threshold comprises the channel access countdown for the second wireless channel. The operations of 1325 may be performed according to the methods described herein. In certain examples, aspects of the operations of 1325 may be performed by a first CCA component as described with reference to FIGS. 7 through 10.

At 1330 the STA 115 or an AP 105 may communicate on the first wireless channel and the second wireless channel based at least in part on the second CCA procedure indicating the second wireless channel is clear. The operations of 1330 may be performed according to the methods described herein. In certain examples, aspects of the operations of 1330 may be performed by a data manager as described with reference to FIGS. 7 through 10.

Figure 14:
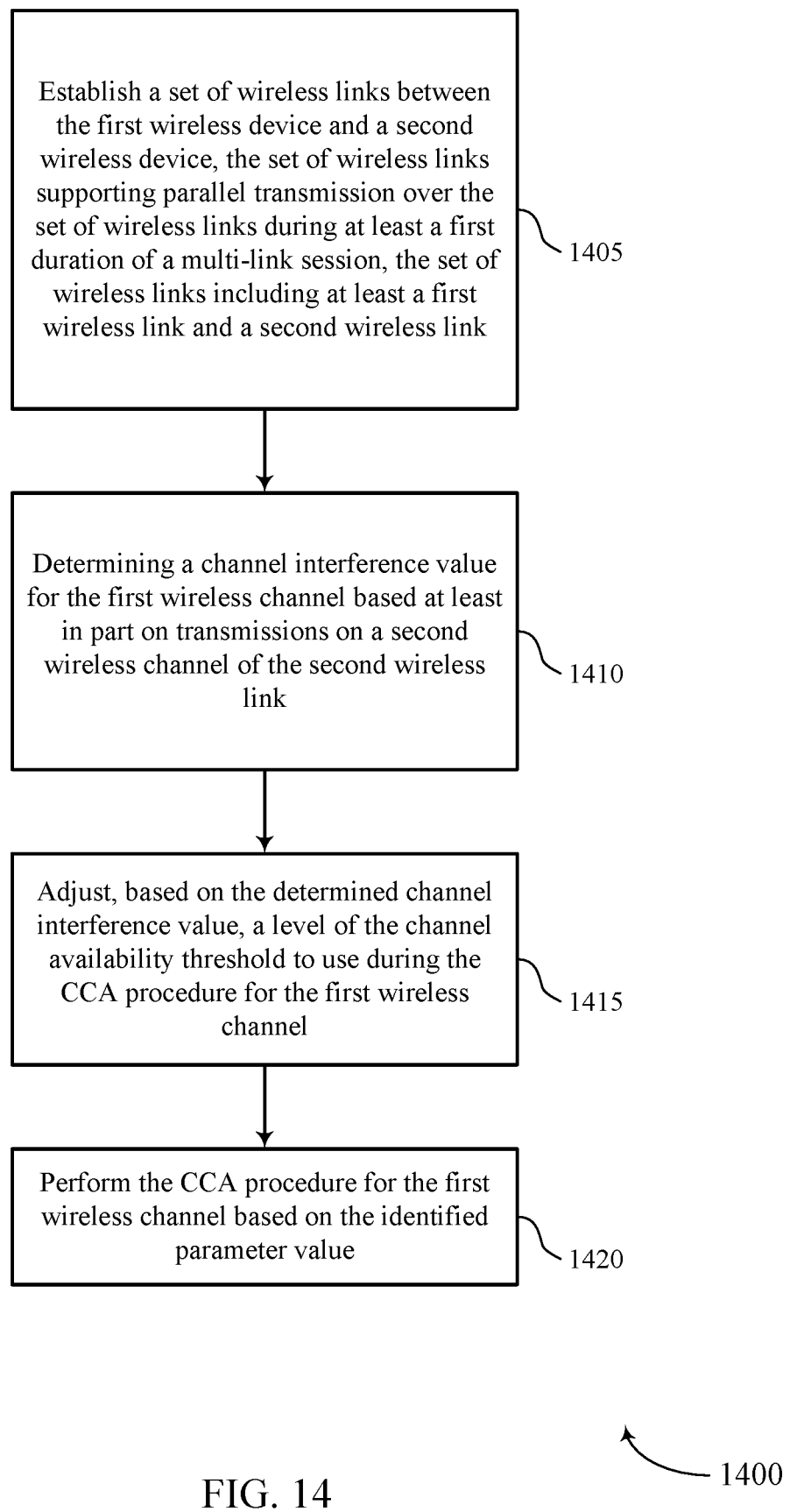

FIG. 14 shows a flowchart illustrating a method 1400 for clear channel assessment adjustment for in-band link aggregation in accordance with aspects of the present disclosure. The operations of method 1400 may be implemented by a STA 115 or an AP 105 or its components as described herein. For example, the operations of method 1400 may be performed by a communications manager as described with reference to FIGS. 7 through 10. In some examples, a STA 115 or an AP 105 may execute a set of codes to control the functional elements of the device to perform the functions described below. Additionally or alternatively, the STA 115 or an AP 105 may perform aspects of the functions described below using special-purpose hardware.

At 1405 the STA 115 or an AP 105 may establish a plurality of wireless links between the first wireless device and a second wireless device, the plurality of wireless links supporting parallel transmission over the plurality of wireless links during at least a first duration of a multi-link session, the plurality of wireless links including at least a first wireless link and a second wireless link. The operations of 1405 may be performed according to the methods described herein. In certain examples, aspects of the operations of 1405 may be performed by a link manager as described with reference to FIGS. 7 through 10.

At 1410 the STA 115 or an AP 105 may identify a parameter value modifying a channel availability threshold to use during a CCA procedure for a first wireless channel of the first wireless link based at least in part on a presence of the second wireless link. The operations of 1410 may be performed according to the methods described herein. In certain examples, aspects of the operations of 1410 may be performed by a channel access component as described with reference to FIGS. 7 through 10.

At 1415 the STA 115 or an AP 105 may adjust, based at least in part on the determined channel interference value, a level of the channel availability threshold to use during the CCA procedure for the first wireless channel. The operations of 1415 may be performed according to the methods described herein. In certain examples, aspects of the operations of 1415 may be performed by a channel access component as described with reference to FIGS. 7 through 10.

At 1420 the STA 115 or an AP 105 may perform the CCA procedure for the first wireless channel based at least in part on the identified parameter value. In some cases, identifying the parameter value comprises determining a channel interference value for the first wireless channel based at least in part on transmissions on a second wireless channel of the second wireless link. The operations of 1420 may be performed according to the methods described herein. In certain examples, aspects of the operations of 1420 may be performed by a first CCA component as described with reference to FIGS. 7 through 10.

Figure 15:
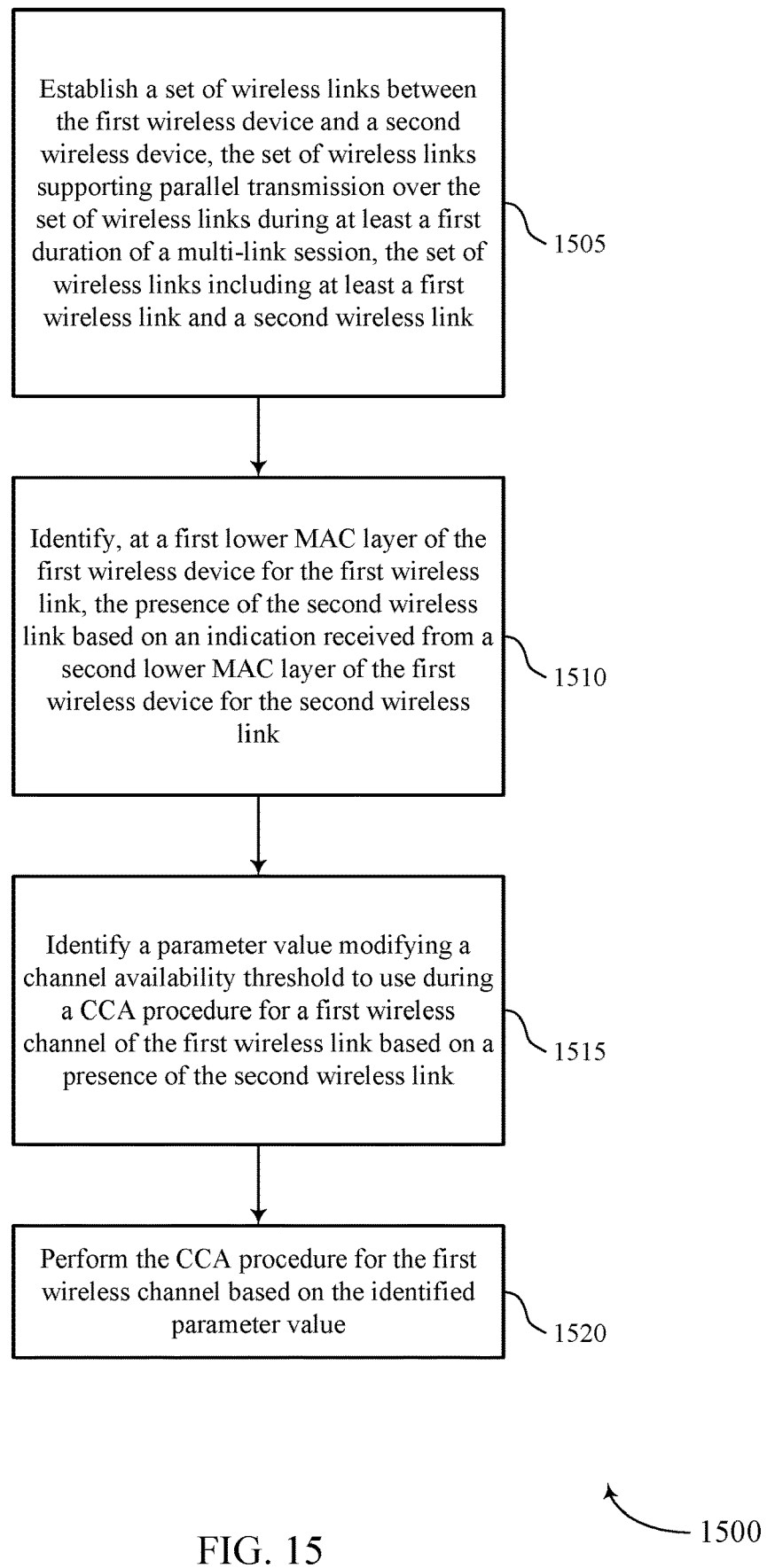

FIG. 15 shows a flowchart illustrating a method 1500 for clear channel assessment adjustment for in-band link aggregation in accordance with aspects of the present disclosure. The operations of method 1500 may be implemented by a STA 115 or an AP 105 or its components as described herein. For example, the operations of method 1500 may be performed by a communications manager as described with reference to FIGS. 7 through 10. In some examples, a STA 115 or an AP 105 may execute a set of codes to control the functional elements of the device to perform the functions described below. Additionally or alternatively, the STA 115 or an AP 105 may perform aspects of the functions described below using special-purpose hardware.

At 1505 the STA 115 or an AP 105 may establish a plurality of wireless links between the first wireless device and a second wireless device, the plurality of wireless links supporting parallel transmission over the plurality of wireless links during at least a first duration of a multi-link session, the plurality of wireless links including at least a first wireless link and a second wireless link. The operations of 1505 may be performed according to the methods described herein. In certain examples, aspects of the operations of 1505 may be performed by a link manager as described with reference to FIGS. 7 through 10.

At 1510 the STA 115 or an AP 105 may identify, at a first lower MAC layer of the first wireless device for the first wireless link, the presence of the second wireless link based at least in part on an indication received from a second lower MAC layer of the first wireless device for the second wireless link. The operations of 1510 may be performed according to the methods described herein. In certain examples, aspects of the operations of 1510 may be performed by a link manager as described with reference to FIGS. 7 through 10.

At 1515 the STA 115 or an AP 105 may identify a parameter value modifying a channel availability threshold to use during a CCA procedure for a first wireless channel of the first wireless link based at least in part on a presence of the second wireless link. The operations of 1515 may be performed according to the methods described herein. In certain examples, aspects of the operations of 1515 may be performed by a channel access component as described with reference to FIGS. 7 through 10.

At 1520 the STA 115 or an AP 105 may perform the CCA procedure for the first wireless channel based at least in part on the identified parameter value. The operations of 1520 may be performed according to the methods described herein. In certain examples, aspects of the operations of 1520 may be performed by a first CCA component as described with reference to FIGS. 7 through 10.

Figure 16:
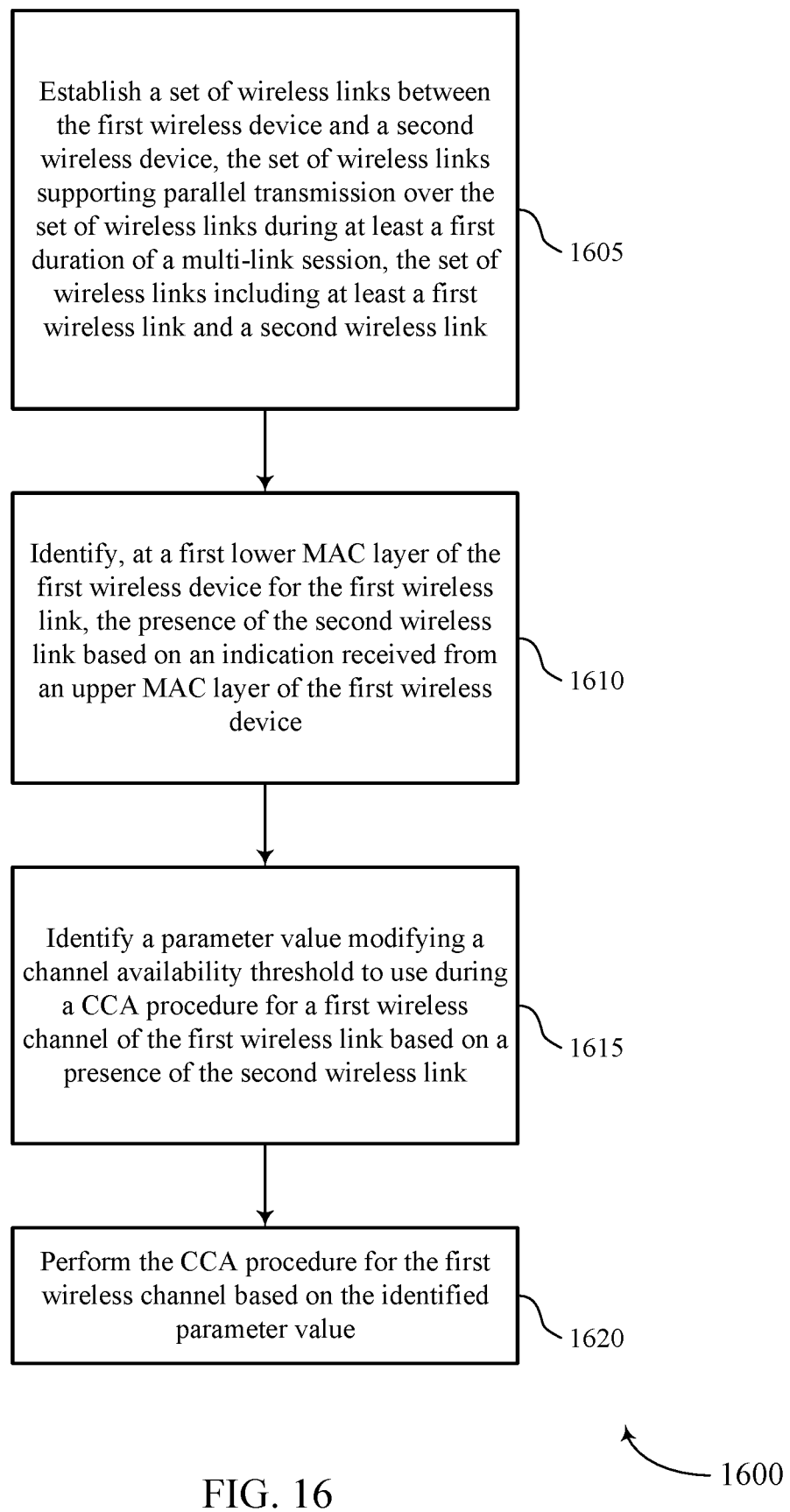

FIG. 16 shows a flowchart illustrating a method 1600 for clear channel assessment adjustment for in-band link aggregation in accordance with aspects of the present disclosure. The operations of method 1600 may be implemented by a STA 115 or an AP 105 or its components as described herein. For example, the operations of method 1600 may be performed by a communications manager as described with reference to FIGS. 7 through 10. In some examples, a STA 115 or an AP 105 may execute a set of codes to control the functional elements of the device to perform the functions described below. Additionally or alternatively, the STA 115 or an AP 105 may perform aspects of the functions described below using special-purpose hardware.

At 1605 the STA 115 or an AP 105 may establish a plurality of wireless links between the first wireless device and a second wireless device, the plurality of wireless links supporting parallel transmission over the plurality of wireless links during at least a first duration of a multi-link session, the plurality of wireless links including at least a first wireless link and a second wireless link. The operations of 1605 may be performed according to the methods described herein. In certain examples, aspects of the operations of 1605 may be performed by a link manager as described with reference to FIGS. 7 through 10.

At 1610 the STA 115 or an AP 105 may identify, at a first lower MAC layer of the first wireless device for the first wireless link, the presence of the second wireless link based at least in part on an indication received from an upper MAC layer of the first wireless device. The operations of 1610 may be performed according to the methods described herein. In certain examples, aspects of the operations of 1610 may be performed by a link manager as described with reference to FIGS. 7 through 10.

At 1615 the STA 115 or an AP 105 may identify a parameter value modifying a channel availability threshold to use during a CCA procedure for a first wireless channel of the first wireless link based at least in part on a presence of the second wireless link. The operations of 1615 may be performed according to the methods described herein. In certain examples, aspects of the operations of 1615 may be performed by a channel access component as described with reference to FIGS. 7 through 10.

At 1620 the STA 115 or an AP 105 may perform the CCA procedure for the first wireless channel based at least in part on the identified parameter value. The operations of 1620 may be performed according to the methods described herein. In certain examples, aspects of the operations of 1620 may be performed by a first CCA component as described with reference to FIGS. 7 through 10.

Figure 17:
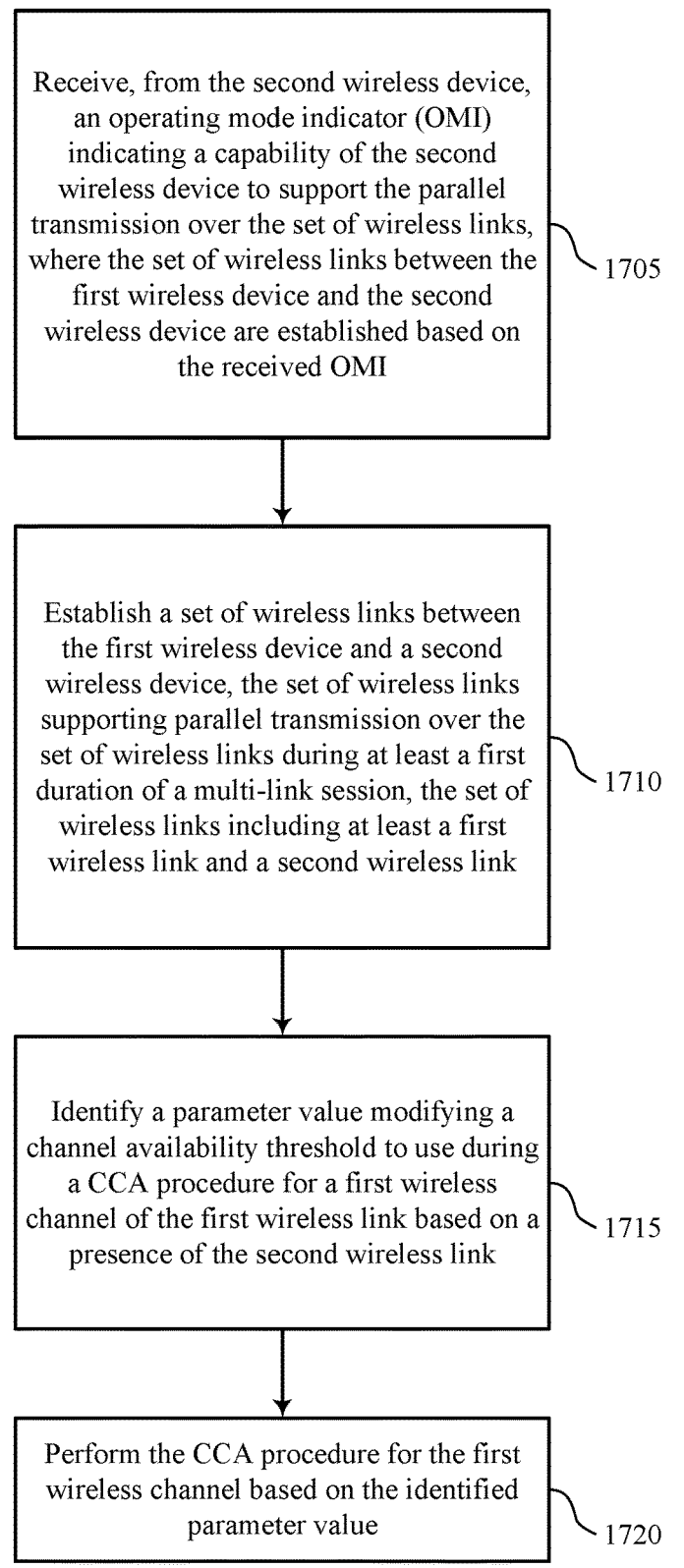

FIG. 17 shows a flowchart illustrating a method 1700 for clear channel assessment adjustment for in-band link aggregation in accordance with aspects of the present disclosure. The operations of method 1700 may be implemented by a STA 115 or an AP 105 or its components as described herein. For example, the operations of method 1700 may be performed by a communications manager as described with reference to FIGS. 7 through 10. In some examples, a STA 115 or an AP 105 may execute a set of codes to control the functional elements of the device to perform the functions described below. Additionally or alternatively, the STA 115 or an AP 105 may perform aspects of the functions described below using special-purpose hardware.

At 1705 the STA 115 or an AP 105 may receive, from the second wireless device, an OMI indicating a capability of the second wireless device to support the parallel transmission over the plurality of wireless links, where the plurality of wireless links between the first wireless device and the second wireless device are established based at least in part on the received OMI. The operations of 1705 may be performed according to the methods described herein. In certain examples, aspects of the operations of 1705 may be performed by an operating mode component as described with reference to FIGS. 7 through 10.

At 1710 the STA 115 or an AP 105 may establish a plurality of wireless links between the first wireless device and a second wireless device, the plurality of wireless links supporting parallel transmission over the plurality of wireless links during at least a first duration of a multi-link session, the plurality of wireless links including at least a first wireless link and a second wireless link. The operations of 1710 may be performed according to the methods described herein. In certain examples, aspects of the operations of 1710 may be performed by a link manager as described with reference to FIGS. 7 through 10.

At 1715 the STA 115 or an AP 105 may identify a parameter value modifying a channel availability threshold to use during a CCA procedure for a first wireless channel of the first wireless link based at least in part on a presence of the second wireless link. The operations of 1715 may be performed according to the methods described herein. In certain examples, aspects of the operations of 1715 may be performed by a channel access component as described with reference to FIGS. 7 through 10.

At 1720 the STA 115 or an AP 105 may perform the CCA procedure for the first wireless channel based at least in part on the identified parameter value. The operations of 1720 may be performed according to the methods described herein. In certain examples, aspects of the operations of 1720 may be performed by a first CCA component as described with reference to FIGS. 7 through 10.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc.

The wireless communications system or systems described herein may support synchronous or asynchronous operation. For synchronous operation, the stations may have similar frame timing, and transmissions from different stations may be approximately aligned in time. For asynchronous operation, the stations may have different frame timing, and transmissions from different stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, WLAN 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on".

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at a first wireless device, comprising:
a processor;
memory in electronic communication with the processor; and
instructions stored in the memory and operable, when executed by the processor, to cause the apparatus to:
establish a plurality of wireless links between the first wireless device and a second wireless device, the plurality of wireless links supporting parallel transmission over the plurality of wireless links during at least a first duration of a multi-link session, the plurality of wireless links including at least a first wireless link and a second wireless link;
identify a parameter value modifying a channel availability threshold to use during a clear channel assessment (CCA) procedure for a first wireless channel of the first wireless link, wherein the parameter value modifies the channel availability threshold based at least in part on a presence of the second wireless link;
identify that a second wireless channel of the second wireless link is clear based at least in part on a second CCA procedure;
bypass a channel access countdown for the first wireless channel based at least in part on identifying that the second wireless channel is clear; and
perform the CCA procedure for the first wireless channel based at least in part on the identified parameter value and bypassing the channel access countdown.

2. The apparatus of claim 1, wherein the instructions are further executable by the processor to:
identify, based at least in part on the presence of the second wireless link, a level of the channel availability threshold to be used during the CCA procedure for the first wireless channel.

3. The apparatus of claim 1, wherein the instructions are further executable by the processor to:
communicate using the second wireless channel of the second wireless link based at least in part on the second CCA procedure indicating that energy detected on the second wireless channel is below a second channel availability threshold, transmissions on the second wireless channel synchronized with transmissions on the first wireless channel.

4. The apparatus of claim 1, wherein the instructions are further executable by the processor to:
perform a channel access countdown for the second wireless channel of the second wireless link; and
perform the CCA procedure for the first wireless channel following the channel access countdown for the second wireless channel, wherein the parameter value modifying the channel availability threshold comprises the channel access countdown for the second wireless channel.

5. The apparatus of claim 4, wherein the instructions are further executable by the processor to:
perform the second CCA procedure for the second wireless channel of the second wireless link following the channel access countdown for the second wireless channel; and
communicate on the first wireless channel and the second wireless channel based at least in part on the second CCA procedure indicating the second wireless channel is clear.

6. The apparatus of claim 1, wherein the instructions are further executable by the processor to:
determine a channel interference value for the first wireless channel based at least in part on transmissions on the second wireless channel of the second wireless link; and
adjust, based at least in part on the determined channel interference value, a level of the channel availability threshold to use during the CCA procedure for the first wireless channel.

7. The apparatus of claim 6, wherein the instructions are further executable by the processor to:
perform the channel access countdown for the first wireless channel.

8. The apparatus of claim 7, wherein the instructions are further executable by the processor to:
communicate on the first wireless channel following the channel access countdown based at least in part on the CCA procedure using the adjusted channel availability threshold level indicating that the first wireless channel is clear.

9. The apparatus of claim 6, wherein the instructions executable by the processor to adjust the level of the channel availability threshold to use during the CCA procedure are operable based at least in part on a tolerance number, or a frequency separation between the first wireless channel and the second wireless channel, or a separation between two or more antennas of the first wireless device, or a combination thereof.

10. The apparatus of claim 6, wherein the instructions are further executable by the processor to:
apply an energy detection offset to the channel availability threshold.

11. The apparatus of claim 1, wherein the instructions are further executable by the processor to:
identify, at a first lower media access control (MAC) layer of the first wireless device for the first wireless link, the presence of the second wireless link based at least in part on an indication received from a second lower MAC layer of the first wireless device for the second wireless link.

12. The apparatus of claim 1, wherein the instructions are further executable by the processor to:
identify, at a first lower media access control (MAC) layer of the first wireless device for the first wireless link, the presence of the second wireless link based at least in part on an indication received from an upper MAC layer of the first wireless device.

13. The apparatus of claim 1, wherein the instructions are further executable by the processor to:

receive, from the second wireless device, an indicator of a capability of the second wireless device to support the parallel transmission over the plurality of wireless links, wherein the plurality of wireless links between the first wireless device and the second wireless device are established based at least in part on the received indicator.

14. The apparatus of claim 1, wherein:
the first wireless link comprises the first wireless channel in a first radio frequency (RF) spectrum band; and
the second wireless link comprises a second wireless channel in the first RF spectrum band or a second RF spectrum band.

15. The apparatus of claim 1, wherein the instructions are further executable by the processor to:
initiate based at least in part on bypassing the channel access countdown for the first wireless channel, a first transmission over the first wireless channel and a second transmission over the second wireless channel, the second transmission synchronized with the first transmission.

16. A method for wireless communication at a first wireless device, comprising:
establishing a plurality of wireless links between the first wireless device and a second wireless device, the plurality of wireless links supporting parallel transmission over the plurality of wireless links during at least a first duration of a multi-link session, the plurality of wireless links including at least a first wireless link and a second wireless link;
identifying a parameter value modifying a channel availability threshold to use during a clear channel assessment (CCA) procedure for a first wireless channel of the first wireless link, wherein the first parameter value modifies the channel availability threshold based at least in part on a presence of the second wireless link;
performing a channel access countdown for a second wireless channel of the second wireless link;
performing the CCA procedure for the first wireless channel following the channel access countdown for the second wireless channel, wherein the parameter value modifying the channel availability threshold comprises the channel access countdown for the second wireless channel.
identifying that a second wireless channel of the second wireless link is clear based at least in part on a second CCA procedure;
bypassing a channel access countdown for the first wireless channel based at least in part on identifying that the second wireless channel is clear; and
performing the CCA procedure for the first wireless channel based at least in part on the identified parameter value and bypassing the channel access countdown.

17. The method of claim 16, wherein identifying the parameter value comprises:
identifying, based at least in part on the presence of the second wireless link, a level of the channel availability threshold to be used during the CCA procedure for the first wireless channel.

18. The method of claim 16, further comprising:
communicating using the second wireless channel of the second wireless link based at least in part on the second CCA procedure indicating that energy detected on the second wireless channel is below a second channel availability threshold, transmissions on the second wireless channel synchronized with transmissions on the first wireless channel.

19. The method of claim 16, further comprising:
performing a channel access countdown for the second wireless channel of the second wireless link; and
performing the CCA procedure for the first wireless channel following the channel access countdown for the second wireless channel, wherein the parameter value modifying the channel availability threshold comprises the channel access countdown for the second wireless channel.

20. The method of claim 19, further comprising:
performing the second CCA procedure for the second wireless channel of the second wireless link following the channel access countdown for the second wireless channel; and
communicating on the first wireless channel and the second wireless channel based at least in part on the second CCA procedure indicating the second wireless channel is clear.

21. The method of claim 16, wherein identifying the parameter value comprises:
determining a channel interference value for the first wireless channel based at least in part on transmissions on the second wireless channel of the second wireless link; and
adjusting, based at least in part on the determined channel interference value, a level of the channel availability threshold to use during the CCA procedure for the first wireless channel.

22. The method of claim 21, further comprising:
performing the channel access countdown for the first wireless channel; and
communicating on the first wireless channel following the channel access countdown based at least in part on the CCA procedure using the adjusted channel availability threshold level indicating that the first wireless channel is clear.

23. The method of claim 21, wherein adjusting the level of the channel availability threshold to use during the CCA procedure is further based at least in part on a tolerance number, or a frequency separation between the first wireless channel and the second wireless channel, or a separation between two or more antennas of the first wireless device, or a combination thereof.

24. The method of claim 16, further comprising:
identifying, at a first lower media access control (MAC) layer of the first wireless device for the first wireless link, the presence of the second wireless link based at least in part on an indication received from a second lower MAC layer of the first wireless device for the second wireless link.

25. The method of claim 16, further comprising:
identifying, at a first lower media access control (MAC) layer of the first wireless device for the first wireless link, the presence of the second wireless link based at least in part on an indication received from an upper MAC layer of the first wireless device.

26. The method of claim 16, further comprising:
receiving, from the second wireless device, an indicator of a capability of the second wireless device to support the parallel transmission over the plurality of wireless links, wherein the plurality of wireless links between the first wireless device and the second wireless device are established based at least in part on the received indicator.

27. The method of claim 16, further comprising:
initiating, based at least in part on bypassing the channel access countdown for the first wireless channel, a first transmission over the first wireless channel and a second transmission over the second wireless channel, the second transmission synchronized with the first transmission.

28. An apparatus for wireless communication at a first wireless device, comprising:
means for establishing a plurality of wireless links between the first wireless device and a second wireless device, the plurality of wireless links supporting parallel transmission over the plurality of wireless links during at least a first duration of a multi-link session, the plurality of wireless links including at least a first wireless link and a second wireless link;
means for identifying a parameter value modifying a channel availability threshold to use during a clear channel assessment (CCA) procedure for a first wireless channel of the first wireless link, wherein the parameter value modifies the channel availability threshold based at least in part on a presence of the second wireless link;
means for identifying that a second wireless channel of the second wireless link is clear based at least in part on a second CCA procedure;
means for bypassing a channel access countdown for the first wireless channel based at least in part on identifying that the second wireless channel is clear; and
means for performing the CCA procedure for the first wireless channel based at least in part on the identified parameter value and bypassing the channel access countdown.

29. The apparatus of claim 28, further comprising:
means for identifying, based at least in part on the presence of the second wireless link, a level of the channel availability threshold to be used during the CCA procedure for the first wireless channel.

30. A non-transitory computer readable medium storing code for wireless communication at a first wireless device, the code comprising instructions executable by a processor to:
establish a plurality of wireless links between the first wireless device and a second wireless device, the plurality of wireless links supporting parallel transmission over the plurality of wireless links during at least a first duration of a multi-link session, the plurality of wireless links including at least a first wireless link and a second wireless link;
identify a parameter value modifying a channel availability threshold to use during a clear channel assessment (CCA) procedure for a first wireless channel of the first wireless link, wherein the parameter value modifies the channel availability threshold based at least in part on a presence of the second wireless link;
identify that a second wireless channel of the second wireless link is clear based at least in part on a second CCA procedure;
bypass a channel access countdown for the first wireless channel based at least in part on identifying that the second wireless channel is clear; and
perform the CCA procedure for the first wireless channel based at least in part on the identified parameter value and bypassing the channel access countdown.

* * * * *